United States Patent
Podgorny et al.

(10) Patent No.: US 10,467,541 B2
(45) Date of Patent: Nov. 5, 2019

(54) METHOD AND SYSTEM FOR IMPROVING CONTENT SEARCHING IN A QUESTION AND ANSWER CUSTOMER SUPPORT SYSTEM BY USING A CROWD-MACHINE LEARNING HYBRID PREDICTIVE MODEL

(71) Applicant: Intuit Inc., Mountain View, CA (US)

(72) Inventors: Igor A. Podgorny, San Diego, CA (US); Benjamin Indyk, San Diego, CA (US); Matthew Cannon, San Diego, CA (US); Jonathan Guidry, San Diego, CA (US); Irene F. Ma, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 577 days.

(21) Appl. No.: 15/220,677

(22) Filed: Jul. 27, 2016

(65) Prior Publication Data

US 2018/0032890 A1 Feb. 1, 2018

(51) Int. Cl.
*G06Q 10/06* (2012.01)
*G06N 99/00* (2019.01)
(Continued)

(52) U.S. Cl.
CPC .......... *G06N 7/005* (2013.01); *G06F 16/3326* (2019.01); *G06F 16/90332* (2019.01); *G06F 16/951* (2019.01); *G06Q 30/016* (2013.01)

(58) Field of Classification Search
CPC .............. G06N 7/005; G06F 16/90332; G06F 16/3326; G06F 16/951; G06Q 30/016
(Continued)

(56) References Cited

U.S. PATENT DOCUMENTS 5,471,382 A 11/1995 Tallman et al.
5,519,608 A 5/1996 Kupiec
(Continued)

FOREIGN PATENT DOCUMENTS

CN 101520802 4/2009
EP 2159715 3/2010
(Continued)

OTHER PUBLICATIONS

The Scientific Marketer, "Uplift Modelling FAQ", article date of Sep. 27, 2007, retrieved from http://scientificmarketer.com/2007/09/uplift-modelling-faq.html (Year: 2007).
(Continued)

*Primary Examiner* — Brandon S Cole
(74) *Attorney, Agent, or Firm* — Hawley Troxell Ennis & Hawley LLP; Philip McKay

(57) ABSTRACT

A method and system improves content searching in a question and answer customer support system by using a crowd-machine learning hybrid predictive model, according to one embodiment. The question and answer customer support system determines which customer support content to provide to users by using the hybrid predictive model, according to one embodiment. The question and answer customer support system receives a search query from a user and applies the search query (or a representation of the search query) to the hybrid predictive model, according to one embodiment. The hybrid predictive model generates a likelihood that particular customer support content is relevant to a user's search query, according to one embodiment. The question and answer customer support system acquires user feedback from users and updates/trains the hybrid predictive model based on the user feedback, according to one embodiment.

23 Claims, 8 Drawing Sheets

(51) Int. Cl.

| | | |
|---|---|---|
| G06F 17/30 | (2006.01) | |
| G06Q 50/00 | (2012.01) | |
| G06F 15/18 | (2006.01) | |
| G06Q 30/02 | (2012.01) | |
| G06N 7/00 | (2006.01) | |
| G06F 16/332 | (2019.01) | |
| G06Q 30/00 | (2012.01) | |
| G06F 16/9032 | (2019.01) | |
| G06F 16/951 | (2019.01) | |

(58) Field of Classification Search
USPC .................................................. 706/1–62
See application file for complete search history.

(56) References Cited

U.S. PATENT DOCUMENTS

| | | | |
|---|---|---|---|
| 6,147,975 A | 11/2000 | Bowman-Amuah | |
| 6,601,055 B1 | 7/2003 | Roberts | |
| 7,013,263 B1 | 3/2006 | Isaka et al. | |
| 7,222,078 B2 | 5/2007 | Abelow | |
| 7,385,716 B1 | 6/2008 | Skaanning | |
| 7,594,176 B1 | 9/2009 | English | |
| 7,685,144 B1 | 3/2010 | Katragadda | |
| 7,974,860 B1 | 7/2011 | Travis | |
| 8,200,527 B1 | 6/2012 | Thompson et al. | |
| 8,311,792 B1 | 11/2012 | Podgorny et al. | |
| 8,341,167 B1 | 12/2012 | Podgorny et al. | |
| 8,484,228 B2* | 7/2013 | Bhattacharyya | G06Q 10/10 707/754 |
| 8,645,298 B2 | 2/2014 | Hennig et al. | |
| 8,660,849 B2 | 2/2014 | Gruber et al. | |
| 8,817,968 B1 | 8/2014 | Boutcher et al. | |
| 8,892,539 B2 | 11/2014 | Anand et al. | |
| 8,909,568 B1* | 12/2014 | Mann | G06N 20/00 706/12 |
| 8,943,145 B1 | 1/2015 | Peters et al. | |
| 8,983,977 B2 | 3/2015 | Ishikawa et al. | |
| 9,015,031 B2 | 4/2015 | Ferrucci et al. | |
| 9,060,062 B1* | 6/2015 | Madahar | H04M 3/5183 |
| 9,063,983 B1 | 6/2015 | Lee | |
| 9,247,066 B1 | 1/2016 | Stec et al. | |
| 9,336,211 B1 | 5/2016 | Bousquet et al. | |
| 9,336,269 B1* | 5/2016 | Smith | G06F 16/951 |
| 9,342,608 B2 | 5/2016 | Cook et al. | |
| 9,460,191 B1 | 10/2016 | Gaucher et al. | |
| 9,471,883 B2* | 10/2016 | Chatterjee | G06F 16/93 |
| 9,582,757 B1 | 2/2017 | Holmes et al. | |
| 9,633,309 B2 | 4/2017 | Giffels et al. | |
| 9,779,388 B1* | 10/2017 | Hansen | G06Q 50/01 |
| 9,887,887 B2 | 2/2018 | Hunter et al. | |
| 9,892,367 B2 | 2/2018 | Guo et al. | |
| 9,910,886 B2 | 3/2018 | Adams, Jr. et al. | |
| 10,002,177 B1* | 6/2018 | McClintock | G06F 16/24575 |
| 10,083,213 B1 | 9/2018 | Podgorny et al. | |
| 10,134,050 B1 | 11/2018 | Hung et al. | |
| 10,147,037 B1 | 12/2018 | Podgorny et al. | |
| 10,162,734 B1* | 12/2018 | Podgorny | G06F 11/366 |
| 2002/0111888 A1 | 8/2002 | Stanley et al. | |
| 2002/0111926 A1 | 8/2002 | Bebie | |
| 2002/0123983 A1 | 9/2002 | Riley et al. | |
| 2002/0169595 A1 | 11/2002 | Agichtein et al. | |
| 2003/0099924 A1 | 5/2003 | Tsuboi et al. | |
| 2003/0144873 A1 | 7/2003 | Keshel | |
| 2004/0024739 A1 | 2/2004 | Copperman et al. | |
| 2005/0114327 A1 | 5/2005 | Kumamoto et al. | |
| 2006/0085750 A1 | 4/2006 | Easton et al. | |
| 2006/0265232 A1 | 11/2006 | Katariya et al. | |
| 2007/0011131 A1 | 1/2007 | Delefevre | |
| 2007/0219863 A1 | 9/2007 | Park et al. | |
| 2007/0259325 A1 | 11/2007 | Clapper | |
| 2008/0189197 A1 | 8/2008 | Allanson et al. | |
| 2008/0208610 A1* | 8/2008 | Thomas | G06Q 30/02 705/1.1 |
| 2008/0215541 A1 | 9/2008 | Li et al. | |
| 2008/0294637 A1 | 11/2008 | Liu | |
| 2009/0012926 A1 | 1/2009 | Ishikawa et al. | |
| 2009/0119575 A1 | 5/2009 | Velusamy | |
| 2009/0162824 A1 | 6/2009 | Heck | |
| 2009/0248659 A1 | 10/2009 | McCool et al. | |
| 2009/0253112 A1 | 10/2009 | Cao et al. | |
| 2009/0265340 A1 | 10/2009 | Barcklay et al. | |
| 2010/0068687 A1 | 3/2010 | Bertelsen | |
| 2010/0070554 A1 | 3/2010 | Richardson et al. | |
| 2010/0076998 A1 | 3/2010 | Podgorny et al. | |
| 2010/0088262 A1 | 4/2010 | Visel et al. | |
| 2010/0185630 A1 | 7/2010 | Cheng et al. | |
| 2010/0191686 A1 | 7/2010 | Wang et al. | |
| 2010/0203492 A1 | 8/2010 | Nibe et al. | |
| 2010/0205550 A1 | 8/2010 | Chen et al. | |
| 2010/0235361 A1 | 9/2010 | Chandran et al. | |
| 2010/0241971 A1 | 9/2010 | Zuber | |
| 2010/0318919 A1 | 12/2010 | Murphy et al. | |
| 2011/0055699 A1 | 3/2011 | Li et al. | |
| 2011/0125734 A1 | 5/2011 | Duboue et al. | |
| 2011/0202472 A1 | 8/2011 | Wan et al. | |
| 2011/0231347 A1 | 9/2011 | Xu et al. | |
| 2011/0264569 A1 | 10/2011 | Houseworth et al. | |
| 2011/0282892 A1 | 11/2011 | Castellani et al. | |
| 2012/0005148 A1 | 1/2012 | Horvitz et al. | |
| 2012/0005219 A1 | 1/2012 | Apacible et al. | |
| 2012/0022983 A1 | 1/2012 | Hughes et al. | |
| 2012/0084120 A1* | 4/2012 | Hirsch | G06Q 30/02 705/7.32 |
| 2012/0084185 A1 | 4/2012 | Ciaramitaro et al. | |
| 2012/0084293 A1 | 4/2012 | Brown et al. | |
| 2012/0095976 A1 | 4/2012 | Hebenthal et al. | |
| 2012/0130910 A1 | 5/2012 | Al-Alami | |
| 2012/0130978 A1 | 5/2012 | Li et al. | |
| 2012/0136764 A1 | 5/2012 | Miller et al. | |
| 2012/0166438 A1 | 6/2012 | Wu et al. | |
| 2012/0219142 A1 | 8/2012 | Gould | |
| 2012/0233191 A1 | 9/2012 | Ramanujam | |
| 2012/0331052 A1 | 12/2012 | Rathod | |
| 2013/0019286 A1 | 1/2013 | Barborak et al. | |
| 2013/0054497 A1 | 2/2013 | Garland et al. | |
| 2013/0066693 A1 | 3/2013 | Laird-McConnell et al. | |
| 2013/0073390 A1 | 3/2013 | Konig et al. | |
| 2013/0110823 A1 | 5/2013 | Su et al. | |
| 2013/0111323 A1 | 5/2013 | Taghaddos et al. | |
| 2013/0117677 A1 | 5/2013 | St. Jacques, Jr. | |
| 2013/0282363 A1 | 10/2013 | Fan et al. | |
| 2013/0285855 A1 | 10/2013 | Dupray et al. | |
| 2013/0297553 A1 | 11/2013 | Bierner | |
| 2013/0304730 A1 | 11/2013 | Zhou | |
| 2013/0325992 A1 | 12/2013 | McGann et al. | |
| 2013/0339870 A1 | 12/2013 | Tandra Sishtla et al. | |
| 2014/0006012 A1 | 1/2014 | Zhou et al. | |
| 2014/0022328 A1 | 1/2014 | Gechter et al. | |
| 2014/0052606 A1 | 2/2014 | Vasudevan et al. | |
| 2014/0075004 A1* | 3/2014 | Van Dusen | H04L 41/04 709/223 |
| 2014/0088944 A1 | 3/2014 | Natarajan et al. | |
| 2014/0114822 A1 | 4/2014 | Sharma et al. | |
| 2014/0119531 A1 | 5/2014 | Tuchman et al. | |
| 2014/0172883 A1 | 6/2014 | Clark et al. | |
| 2014/0189829 A1 | 7/2014 | McLachlan et al. | |
| 2014/0195613 A1 | 7/2014 | Ogilvie | |
| 2014/0201045 A1 | 7/2014 | Pai et al. | |
| 2014/0222669 A1 | 8/2014 | Novak et al. | |
| 2014/0280070 A1 | 9/2014 | George et al. | |
| 2014/0308648 A1 | 10/2014 | Jain | |
| 2014/0316856 A1 | 10/2014 | Williams et al. | |
| 2014/0324856 A1 | 10/2014 | Lahiani et al. | |
| 2014/0337257 A1 | 11/2014 | Chatterjee et al. | |
| 2014/0372980 A1 | 12/2014 | Verma et al. | |
| 2015/0052087 A1 | 2/2015 | Srinivasan et al. | |
| 2015/0058380 A1 | 2/2015 | Polonsky et al. | |
| 2015/0088608 A1* | 3/2015 | Cama | G06Q 30/00 705/7.32 |
| 2015/0095267 A1 | 4/2015 | Behere et al. | |
| 2015/0120718 A1 | 4/2015 | Luo et al. | |
| 2015/0127587 A1 | 5/2015 | Pinckney et al. | |
| 2015/0139415 A1 | 5/2015 | Skiba et al. | |

(56) References Cited

U.S. PATENT DOCUMENTS

| | | |
|---|---|---|
| 2015/0229531 A1* | 8/2015 | O'Sullivan .......... G06Q 50/01 709/223 |
| 2015/0254785 A1 | 9/2015 | Yang et al. |
| 2015/0324805 A1 | 11/2015 | Skiba et al. |
| 2015/0363481 A1 | 12/2015 | Haynes |
| 2015/0371137 A1 | 12/2015 | Giffels et al. |
| 2016/0048772 A1 | 2/2016 | Bruno et al. |
| 2016/0055234 A1 | 2/2016 | Visotski et al. |
| 2016/0062980 A1 | 3/2016 | Boguraev et al. |
| 2016/0103833 A1 | 4/2016 | Sanders et al. |
| 2016/0148222 A1* | 5/2016 | Davar ............... G06Q 30/0201 705/7.32 |
| 2016/0148321 A1 | 5/2016 | Ciaramitaro et al. |
| 2016/0180470 A1 | 6/2016 | Mascaro et al. |
| 2016/0189029 A1 | 6/2016 | Giffels et al. |
| 2016/0196497 A1 | 7/2016 | Allen et al. |
| 2016/0217472 A1 | 7/2016 | Podgorny et al. |
| 2016/0283491 A1 | 9/2016 | Lu et al. |
| 2016/0306846 A1 | 10/2016 | Adams, Jr. et al. |
| 2017/0024424 A1 | 1/2017 | Almohizea |
| 2017/0032251 A1 | 2/2017 | Podgorny et al. |
| 2017/0032468 A1 | 2/2017 | Wang et al. |
| 2017/0124184 A1* | 5/2017 | Podgorny .............. G06N 7/005 |
| 2017/0270159 A1 | 9/2017 | Wang et al. |
| 2017/0323233 A1* | 11/2017 | Bencke ............ G06Q 10/0633 |
| 2018/0032890 A1 | 2/2018 | Podgorny et al. |
| 2018/0089283 A1 | 3/2018 | Indyk et al. |
| 2018/0108092 A1 | 4/2018 | Goodyear et al. |
| 2018/0108093 A1 | 4/2018 | Podgorny et al. |
| 2018/0113935 A1 | 4/2018 | George et al. |
| 2019/0018692 A1 | 1/2019 | Indyk et al. |
| 2019/0018899 A1 | 1/2019 | Podgorny et al. |

FOREIGN PATENT DOCUMENTS

| | | |
|---|---|---|
| JP | 2014112316 | 6/2014 |
| WO | WO 2011/053830 | 5/2011 |

OTHER PUBLICATIONS

Zadeh, Z.; "Probabilistic Modeling in Community-Based Question Answering Services," Dalhousie University, Halifax, Nova Scotia; Feb. 2012.

Podgorny, et al. "Real Time Detection and Intervention of Poorly Phrased Questions," CHI EA '15, Proceedings of the 33$^{rd}$ Annual ACM Conference Extended Abstracts on Human Factors in Computing Systems, Apr. 18-23, 2015, Seoul, Republic of Korea, pp. 2205-2210.

Get Satisfaction [online]. Sprinklr, 2017 [retrieved on Nov. 22, 2017]. Retrieved from the Internet: <URL: https://getsatisfaction.com/corp>.

Bartolome et al., "Processing Unstructured Voice of Customer Feedback for Improving Content Rankings in Customer Support Systems," U.S. Appl. No. 15/094,653, filed Apr. 8, 2016.

Podgorny, et al., "Content Quality and User Ranking in TurboTax AnswerXchange," Proceedings of the European Conference on Social Media, University of Brighton UK, Jul. 10-11, 2014.

Dror, et al., "From Query to Question in One Click: Suggesting Synthetic Questions to Searchers," International World Wide Web Conferences Steering Committee, May 13, 2013, pp. 391-401.

* cited by examiner

100

Intuit
TurboTax ✓ AnswerXchange    Go to TurboTax.com   Sign In

ALL ▼ | Search the community... | {...SEARCH QUERY...} 🔍    Health Care

‹ Back to search results    101        102

104

Deductions Keogh plan Excess Social Security tax withheld Marital deduction Nonbusiness bad debt itemized deduct.

Asked by gbenning008
TurboTax Deluxe
⊘ 8 months ago

Options ▼

Automobile, business use SIMPLE Exemptions Conservation easements Real estate taxes Education savings account Vacation home Education interest Investment interest

106

ANSWER
3 people found this helpful

110

Cray paleo tatooed, Truffaut skateboard street art PBR jean shorts Shoreditch farm-to-table Austin lo-fi Odd Future occupy. Chia semiotics skateboard, Schlitz messanger bag master cleanse High Life occupy vegan polaroid tote bag leggings. Single-origin coffee mumblecore deep v salvia mlkshk. Organic photo booth cray tofu, vegan fixie bitters sriracha. Blog Austin Wes Anderson, deep v pout-over trust fund vinyl mlkshk +1.

HuskerFan
⊘ answered 8 months ago

Q Add a comment

Answer helpful? [YES]  [NO]  ⟵ 112
Answer quality? [GOOD] [POOR] ⟵ 114
Answer accurate? [YES]  [NO]  ⟵ 116

108  SIMILAR QUESTIONS

How was the ranking of this answer (e.g., too high, just night, etc.)?

How do I switch from filing jointly to filing separately?
If both of you already filed your returns with the Married Filing Separately status, you only need to amend one return; the other will be disregarded when the IRS receives your amendment....

118

Truffaut skateboard street art PBR jean shorts Shoreditch farm-to-table?
If both of you already filed your returns with the Married Filing Separately status, you only need to amend one return; the other will be disregarded when the IRS receives your amendment....

Messenger bag master cleanse High Life occupy vegan polaroid?
If both of you already filed your returns with the Married Filing Separately status, you only need to amend one return; the other will be disregarded when the IRS receives your amendment....

MORE ACTIONS

🔔 Notify me of new answers
❓ I can answer

Do you still have a question?
Ask your question to the community. Most questions get a response in about a day.

(?) Post your question to the community

Intuit
TurboTax ✓ AnswerXchange

ALL▼ Search the community... {...SEARCH QUERY...}  ☒ —102

< Back to search results
—101

Deductions Keogh plan Excess Social Security tax withheld Marital deduction Nonbusiness bad debt Itemized deduct.

Automobile, business use SIMPLE Exemptions Conservation easements Real estate taxes Education savings account Vacation home Education interest Investment interest

104

106

ANSWER
3 people found this helpful

Cray paleo tatooed, Truffaut skateboard street art PBR jean shorts Shoreditch farm-to-table Austin lo-fi Odd Future occupy. Chia semiotics skateboard, Schlitz messanger bag master cleanse High Life occupy vegan polaroid tote bag leggings. Single-origin coffee mumblecore deep v salvia mlkshk. Organic photo booth cray tofu, vegan fixie bitters sriracha. Blog Austin Wes Anderson, deep v pout-over trust fund vinyl mlkshk +1.

162

HuskerFan
⊘ answered 8 months ago

You marked this as not helpful (undo)

How can we make this answer more helpful?   ✕
Give us some feedback...

164

Don't ask me again                    CANCEL  SUBMIT

Q Add a comment

We really want to find the answer you're looking for.
Which of the following would you say this answer is related to:

EXEMPTIONS  SOCIAL SECURITY  NEITHER

166

108  SIMILAR QUESTIONS

How do I switch from filing jointly to filing separately?
If both of you already filed your returns with the Married Filing Separately status, you only need to amend one return; the other will be disregarded when the IRS receives your amendment....

Truffaut skateboard street art PBR jean shorts Shoreditch farm-to-table?
If both of you already filed your returns with the Married Filing Separately status, you only need to amend one return; the other will be disregarded when the IRS receives your amendment....

Messenger bag master cleanse High Life occupy vegan polaroid?
If both of you already filed your returns with the Married Filing Separately status, you only need to amend one return; the other will be disregarded when the IRS receives your amendment....

FIG. 1C

METHOD AND SYSTEM FOR IMPROVING CONTENT SEARCHING IN A QUESTION AND ANSWER CUSTOMER SUPPORT SYSTEM BY USING A CROWD-MACHINE LEARNING HYBRID PREDICTIVE MODEL

BACKGROUND

Software applications and systems have become indispensable tools for helping consumers, i.e., users, perform a wide variety of tasks in their daily professional and personal lives. Currently, numerous types of desktop, web-based, and cloud-based software systems are available to help users perform a plethora of tasks ranging from basic computing system operations and word processing, to financial management, small business management, tax preparation, health tracking and healthcare management, as well as other personal and business endeavors, operations, and functions far too numerous to individually delineate here.

One major, if not determinative, factor in the utility, and ultimate commercial success, of a given software system of any type is the ability to implement and provide a customer support system through which a given user can obtain assistance and, in particular, get answers to questions that arise during the installation and operation of the software system. However, providing potentially millions of software system users with specialized advice and answers to their specific questions is a huge undertaking that can easily, and rapidly, become economically infeasible.

To address this problem, many providers of software systems implement or sponsor one or more question and answer customer support systems. Typically, a question and answer customer support system includes a hosted forum through which a user can direct their specific questions, typically in a text format, to a support community that often includes other users and/or professional support personal.

In many cases, once a user's specific question is answered by one or more members of the support community through the question and answer customer support system, the user's specific question, and the answer to the specific question provided by the support community, is categorized and added to a customer support question and answer database associated with the question and answer customer support system. In this way, subsequent users of the software system can access the user's specific question or topic, and find the answer to the user's question, via a search of the customer support question and answer database. As a result, a dynamic customer support question and answer database of categorized/indexed user questions and answers is made available to users of the software system through the question and answer customer support system.

The development of customer support question and answer databases has numerous advantages including a self-help element whereby a searching user, i.e., a user accessing the resulting question and answer pair, can find an answer to their particular question by simply searching the customer support question and answer database for topics, questions, and answers related to their issue. In addition, if the answer to the user's specific question is not in the customer support question and answer database, the user can then become an asking user by submitting their question to the question and answer customer support system, typically through the same web-site and/or user interface. Consequently, by using a question and answer customer support system that includes a customer support question and answer database, potentially millions of user questions can be answered in an efficient and effective manner, and with minimal duplicative effort.

Although question and answer customer support systems have information that may adequately answer a user's question, pairing a particular question or search query with the best (e.g., most relevant and/or highest quality) question and answer pair can be difficult. Various techniques have been used, but the existing techniques often times fail to satisfy the users.

What is needed is a method and system for using user-defined features in customer support content to improve content searching in a question and answer customer support system by using a crowd-machine learning hybrid predictive model, according to one embodiment.

SUMMARY

Machines still lack the ability to replicate human insights, and humans fail to recognize many of the patterns that are readily detectible by machines. In question and answer customer support systems, machine learning can be used to identify customer support content that will satisfy a user's search query (e.g., question). In addition to identifying which customer support content is most relevant to a search query, machine learning can also be used to determine which features and/or attributes of the customer support content to use to determine the relevance of the customer support content. Such an approach will identify some relevant content while misidentifying other content as relevant. Instead of relying solely on machine learning (e.g., data mining and/or feature selection) to identify features and/or attributes of the customer support content to use when determining the relevance of customer support content, embodiments of the present disclosure identify additional features and/or attributes of the customer support content from user feedback, according to one embodiment. The question and answer customer support system solicits user feedback from users who receive customer support content, in response to their query submissions, according to one embodiment. The attributes and/or features that correspond with relevance and/or quality of customer support content are extracted from the user feedback, according to one embodiment. Significant quantities of user feedback is obtained from significant numbers of users to identify crowd-nominated features and/or attributes of the customer support content, according to one embodiment. In other words, crowdsourced user feedback is used to extract the crowd-nominated features and/or attributes of the customer support content. A predictive model is then trained to identify relevant and/or quality customer support content using the attributes and/or features of the customer support content that is identified by machine learning and that is identified with crowdsourced user feedback, according to one embodiment. Such a predictive model is a crowd-machine learning hybrid predictive model, according to one embodiment. Embodiments of the present disclosure improve content searching in a question and answer customer support system by using a crowd-machine learning hybrid predictive model (hereafter "hybrid predictive model"), according to one embodiment.

The question and answer customer support system determines which customer support content to provide to users by using a hybrid predictive model, according to one embodiment. The question and answer customer support system receives a search query from a user and applies the search query (or a representation of the search query) to the hybrid predictive model, according to one embodiment. The hybrid predictive model generates one or more content selection scores that represent a likelihood that particular customer support content is relevant to a user's search query, according to one embodiment. The question and answer customer support system provide potentially relevant customer support content to the user, in response to the user's search query, at least partially based on one or more of the content selection scores, according to one embodiment.

The question and answer customer support system solicits the user for user feedback regarding the relevancy and/or quality of the potentially relevant customer support content that was provided to the user, according to one embodiment. The question and answer customer support system uses one or more feedback acquisition features within one or more user experience pages to solicit and obtain user feedback for the customer support content, according to one embodiment. The question and answer customer support system uses one or more feedback acquisition features to obtain user feedback from asking users regarding one or more responses the asking users received in response to the search queries submitted by the asking users, according to one embodiment. The question and answer customer support system uses one or more feedback acquisition features to obtain user feedback from the viewing users regarding reference materials or other customer support content that is provided by the service provider of the question and answer customer support system, according to one embodiment. The question and answer customer support system uses one or more feedback acquisition features to obtain user feedback from viewing users regarding search queries, responses to the search queries, and/or other customer support content that is crowd sourced (e.g., provided by an online community that supports the question and answer customer support system), according to one embodiment. The question and answer customer support system uses one or more feedback acquisition features to obtain user feedback about specific features and/or attributes for the customer support content (e.g., to obtain user feedback about quality of writing, perceived accuracy of content, search ranking, etc.), according to one embodiment. The question and answer customer support system uses a feedback feature predictive model to populate at least part of the one or more feedback acquisition features that are used to obtain user feedback the customer support content, according to one embodiment. The question and answer customer support system uses the feedback feature predictive model to determine one or more feedback acquisition features (e.g., topics, attributes, user experience elements, etc.) to display to users that are based on user segments (e.g., determined based on similar user characteristics, browsing behaviors, clickstream data, etc.), according to one embodiment. In one embodiment, the question and answer customer support systems publishes at least part of the user feedback with the customer support content to allow subsequent users to see the user feedback, to encourage additional users to provide user feedback, according to one embodiment.

These and other embodiments are disclosed in more detail below.

The disclosed embodiments, of a method and system for improving content searching in a question and answer customer support system by using a crowd-machine learning hybrid predictive model, provide a technical solution to the long standing technical problem of how to respond to search queries with relevant and quality content (e.g., customer support content). The method and system, for improving content searching in a question and answer customer support system by using a crowd-machine learning hybrid predictive model, leverage features and/or attributes that are identified using machine learning techniques and crowdsourced user feedback, according to one embodiment. The features and/or attributes are associated with the relevance and/or quality of customer support content, and are used by to train and/or operate the hybrid predictive model, to provide users with customer support content that they are likely to be satisfied with, according to one embodiment. This, in turn, results in: less human and processor resources being dedicated to processing customer support requests; less memory and storage bandwidth being dedicated to buffering and storing complaints for poor search results; and less communication bandwidth being utilized to perform redundant searches for information.

The disclosed method and system for improving content searching in a question and answer customer support system by using a crowd-machine learning hybrid predictive model does not encompass, embody, or preclude other forms of innovation in the area of content searching and/or question and answer customer support systems. In addition, the disclosed method and system for improving content searching in a question and answer customer support system by using a crowd-machine learning hybrid predictive model is not related to any fundamental economic practice, fundamental data processing practice, mental steps, or pen and paper based solutions, and is, in fact, directed to the relatively new problem of searching customer support content in a question and answer customer support system. Consequently, the disclosed method and system for improving content searching in a question and answer customer support system by using a crowd-machine learning hybrid predictive model is not directed to, does not encompass, and is not merely, an abstract idea or concept.

In addition, the disclosed method and system for improving content searching in a question and answer customer support system by using a crowd-machine learning hybrid predictive model provides for significant improvements to the technical fields of user experience, electronic transaction data processing, financial transaction processing, electronic tax return preparation, customer support systems, data processing, and data management.

In addition, as discussed above, the disclosed method and system for improving content searching in a question and answer customer support system by using a crowd-machine learning hybrid predictive model, more accurately quantifies relevant customer support content to better satisfy the needs of a user, which results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for improving content searching in a question and answer customer support system by using a crowd-machine learning hybrid predictive model.

BRIEF DESCRIPTION OF THE DRAWINGS

FIGS. 1A, 1B, and 1C are illustrative examples of user experience pages that are used by a question and answer customer support system to increase the likelihood of identifying and providing relevant and quality customer support content to users in response to search queries in the question and answer customer support system, in accordance with one embodiment.

Figure 1B:

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

TERM DEFINITIONS

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filing or as developed later.

Specific examples of software systems include, but are not limited to the following: TurboTax AnswerXchange® available from Intuit, Inc. of Mountain View, Calif.; TurboTax® available from Intuit, Inc. of Mountain View, Calif.; TurboTax Online™ available from Intuit, Inc. of Mountain View, Calif.; Quicken®, available from Intuit, Inc. of Mountain View, Calif.; Quicken Online™, available from Intuit, Inc. of Mountain View, Calif.; QuickBooks®, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features provided or displayed to the user such as, but not limited to the following: data entry fields; question quality indicators; images; backgrounds; avatars; highlighting mechanisms; icons; and any other features that individually, or in combination, create a user experience, as discussed herein, and/or as known in the art at the time of filing, and/or as developed after the time of filing.

As used herein, the term "question popularity indicator" includes any mechanism, means, or feature/function provided to indicate to a user a determined/estimated popularity of a question being provided by the user. Specific examples of question popularity indicators include, but are not limited to, meter displays; line displays; score displays; audio content; visual content; images; backgrounds; avatars; highlighting mechanisms; icons; and any other features that individually, or in combination, relay to a user a determined, estimated, or predicted quality of a question being submitted.

Herein, the term "party," "user," "user consumer," and "customer" are used interchangeably to denote any party and/or entity that interfaces with, and/or to whom information is provided by, the method and system or improving content searching in a question and answer customer support system by using a crowd-machine learning hybrid predictive model as described herein, and/or a person and/or entity that interfaces with, and/or to whom information is provided by, the method and system or improving content searching in a question and answer customer support system by using a crowd-machine learning hybrid predictive model as described herein, and/or a legal guardian of person and/or entity that interfaces with, and/or to whom information is provided by, the method and system for improving content searching in a question and answer customer support system by using a crowd-machine learning hybrid predictive model as described herein, and/or an authorized agent of any party and/or person and/or entity that interfaces with, and/or to whom information is provided by, the method and system or improving content searching in a question and answer customer support system by using a crowd-machine learning hybrid predictive model as described herein. For instance, in various embodiments, a user can be, but is not limited to, a person, a commercial entity, an application, a service, and/or a computing system.

As used herein, a search query includes search query terms, which are the searchable terms of the search query. A search query can be a question that includes question words (e.g., why, how, what, when, which, where, can, etc.), or the search query can omit question words and simply include a variety of search query terms that relate to one or more topics.

As used herein, the term "probabilistic topic model" or "probabilistic model" denotes one or more individual or combined algorithms or sets of equations that describe, determine, or predict characteristics of or the performance of a datum, a data set, multiple data sets, data objects, a computing system, and/or multiple computing system. The probabilistic topic model include algorithms configured to discover the topics or hidden thematic (or semantic) structure in text, large data objects, and archives of documents. The probabilistic topic models are configured to perform unsupervised learning by discovering/finding hidden structure in unlabeled data, e.g., without an error or reward signal to evaluate a potential solution, according to one embodiment. One implementation of a probabilistic topic model is the Latent Dirichlet allocation ("LDA") algorithm.

As used herein, the term "hybrid predictive model" denotes a predictive model that is trained using features and/or attributes that are identified using both machine learning techniques and crowdsourced user feedback. The term "hybrid predictive model" is used interchangeably with "crowd-machine learning hybrid predictive model". The features and/or attributes can be features and/or attributes of customer support content (e.g., search queries, responses to search queries, and/or reference materials). The features and/or attributes are determined by machine learning techniques, such as data mining and feature selection techniques, to quantify the relevance and/or quality of the customer support content, according to one embodiment. The features and/or attributes are perceived by users as quantifiers for the relevance and/or quality of the customer support content, according to one embodiment. The features and/or attributes are extracted from the crowdsourced user feedback to quantify the relevance and/or quality of the customer support content, according to one embodiment. Features and/or attributes that are received from crowdsourced user feedback and/or extracted from crowdsourced user feedback can be referred to as crowd-nominated features and/or attributes.

DETAILED DISCLOSURE

In question and answer customer support systems, machine learning can be used to identify customer support content that will satisfy a user's search query (e.g., question). In addition to identifying which customer support content is most relevant to a search query, machine learning can also be used to determine which features and/or attributes of the customer support content to use to determine the relevance of the customer support content. Such an approach will identify some relevant content while misidentifying other content as relevant. Instead of relying solely on machine learning to identify features and/or attributes of the customer support content to use when determining the relevance of customer support content, embodiments of the present disclosure obtain additional features and/or attributes of the customer support content directly from users of the question and answer customer support system, for use in determining the relevance and/or quality of customer support content, according to one embodiment. The question and answer customer support system solicits user feedback from users who receive customer support content, in response to their query submissions, according to one embodiment. The attributes and/or features that correspond with relevance and/or quality of customer support content are extracted from the user feedback, according to one embodiment. Significant quantities of user feedback is obtained from significant numbers of users to identify crowd-nominated features and/or attributes of the customer support content, according to one embodiment. In other words, crowdsourced user feedback is used to extract the crowd-nominated features and/or attributes of the customer support content. A predictive model is then trained to identify relevant and/or quality customer support content using the attributes and/or features of the customer support content that is identified by machine learning and that is identified with crowdsourced user feedback, according to one embodiment. Such a predictive model is a crowd-machine learning hybrid predictive model, according to one embodiment. Embodiments of the present disclosure improve content searching in a question and answer customer support system by using a crowd-machine learning hybrid predictive model (hereafter "hybrid predictive model"), according to one embodiment.

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

User Experience

FIGS. 1A, 1B, and 1C illustrate examples of user experience pages that are used by a question and answer customer support system to increase the likelihood of identifying and providing relevant and quality content to users in response to search queries in the question and answer customer support system, according to one embodiment. By increasing the likelihood of identifying and providing relevant and quality content to users, in response to search queries, the question and answer customer support system improves the overall user experience in the question and answer customer support system and particularly improves content searching in the question and answer customer support system, according to one embodiment. The illustrated examples of user experience pages show various embodiments of techniques that can be used to crowdsource user feedback (otherwise known as voice of customer feedback) for use by one or more hybrid predictive models to identify search results to provide to users in response to search queries, according to one embodiment.

The user experience pages enable a question and answer customer support system to solicit users for user feedback regarding the relevancy and/or quality of potentially relevant customer support content that was provided to the users, according to one embodiment. The user experience pages enable the question and answer customer support system to obtain user feedback from asking users regarding one or more responses the asking users received in response to the search queries submitted by the asking users, according to one embodiment. The user experience pages enable the question and answer customer support system to obtain user feedback from the viewing users regarding reference materials or other customer support content that is provided by the service provider of the question and answer customer support system, according to one embodiment. The user experience pages enable the question and answer customer support system to obtain user feedback from viewing users regarding search queries, responses to the search queries, and/or other customer support content that is crowdsourced (e.g., provided by an online community that supports the question and answer customer support system), according to one embodiment. The user experience pages enable the question and answer customer support system to obtain user feedback about specific features and/or attributes for the customer support content (e.g., to obtain user feedback about quality of writing, perceived accuracy of content, search ranking, etc.), according to one embodiment. The user experience pages enable the question and answer customer support system to populate at least part of the one or more feedback acquisition features with content that may be specific to specific groups of users (e.g., specific segments of users), according to one embodiment. In one embodiment, the user experience pages enable the question and answer customer support system to publish at least part of the user feedback with the customer support content to allow subsequent users to see the user feedback, and to encourage additional users to provide user feedback, according to one embodiment.

FIG. 1A includes a user experience page 100 that is configured to facilitate crowdsourcing user feedback that can be used to train and/or update hybrid predictive models that identify which customer support content to provide to users, in response to search queries that includes one or more search query terms, according to one embodiment. The user experience page 100 includes a user experience input element 102, customer support content 104, customer support content 106, customer support content 108, and feedback acquisition features 110, to facilitate improving content searching in the question and answer customer support system, according to one embodiment. In particular, the user experience page 100 facilitates acquiring user feedback that the question and answer customer support system can use to features and/or attributes (e.g., crowd-nominated features and/or attributes) for the customer support content, according to one embodiment. The question and answer customer support system then uses the features and/or attributes to train and/or operate a hybrid predict model to identify relevant customer support content for search queries, according to one embodiment.

The user experience input element 102 enables users to search the question and answer customer support system, according to one embodiment. The users that search the question and answer customer support system for existing customer support content are viewing users, according to one embodiment. The user experience input element 102 is a text box that allows users to input a search query 101 as text (e.g., via a keyboard, a stylus, or voice commands) into the question and answer customer support system to search the question and answer customer support system, according to one embodiment. The users provide search queries that include question words and/or search query terms, according to one embodiment. The question words may be ignored by a traditional search engine or searching algorithms, and include, "who", "what", "where", "when", "how", and the like, according to one embodiment. The question words may be treated/interpreted differently than other search query terms by the searching algorithm, according to one embodiment. The search query terms are terms that can be used by the probabilistic topic model and/or by other predictive models to determine the content, tone, quality, and other characteristics of the search query 101, according to one embodiment.

The users who submit search queries to the question and answer customer support system include asking users and viewing users, according to one embodiment. The viewing users are users who are not submitting a search query for response from the online community that provides content/responses to questions that are entered into the question and answer customer support system, according to one embodiment. The viewing users are searching the question and answer customer support system for existing customer support content, using the search query 101, according to one embodiment. An asking user is a user who attempts to have their question answered by someone in the online community, rather than receiving existing customer support content, according to one embodiment. In one embodiment, a user can start an interaction with the question and answer customer support system as a viewing user and transition into being an asking user. In one embodiment, a user can begin a session with the question and answer customer support system as an asking user and transition into being a viewing user, in response to the content that the user receives from the question and answer customer support system, according to one embodiment.

The customer support content 104 and the customer support content 106 represent existing customer support content that is stored, maintained, and provided to users by the question and answer customer support system, according to one embodiment. The customer support content 104 is a search query (e.g., a question) that has been submitted by a user of the question and answer customer support system, according to one embodiment. The user who submitted the customer support content 104 can be any user of the question and answer customer support system, according to one embodiment. The customer support content 104 is a search query about a particular topic, such as Social Security tax withholding, marital deductions, itemized deductions, and the like, according to one embodiment. The customer support content 104 can be a search query about one or more products that are supported by the question and answer customer support system, according to one embodiment. In one embodiment, the question and answer customer support system supports the product TurboTax® of Intuit®, Inc., of Mountain View, Calif., according to one embodiment. In one embodiment, the question and answer customer support system supports multiple products, such as, but not limited to, a tax return preparation system, a personal financial management system, and/or a business financial management system.

The question and answer customer support system can associate multiple responses, such as customer support content 106, with a search query, such as customer support content 104, according to one embodiment. Each of the one or more responses to the search query can be ranked by popularity (e.g., determined by quantity or ratio of up/down votes) and/or by relevance (e.g., determined by topic), according to one embodiment. The responses associated with a search query can also be ranked by age, by quantity of views, and/or by feedback received through one or more of the feedback acquisition features 110, according to one embodiment. The question and answer customer support system uses a hybrid predictive model to determine the relevance and/or quality of customer support content to the search queries, according to one embodiment.

The question and answer customer support system uses the user experience page 100 to provide customer support content 108 (e.g., similar or related search queries and responses) in response to the search query 101 received in the user experience input element 102, according to one embodiment. The customer support content 108 can be about or include one or more topics that are similar to the search query 101, according to one embodiment. The customer support content 108 can include search queries and/or responses that are related to the customer support content 104 and/or that are related to the customer support content 106, according to one embodiment.

In order to improve the likelihood that the customer support content 104, 106, and/or 108 are relevant to the search query 101, the question and answer customer support system provides one or more of the feedback acquisition features 110 to users to solicit user feedback from which features and/or attributes for the customer support content can be extracted, according to one embodiment. In particular, the question and answer customer support system provides the feedback acquisition features 110 to acquire (crowdsourced) user feedback about the customer support content 106, 104, and/or 108, according to one embodiment. The question and answer customer support system can then use the user feedback (e.g., by extracting features and/or attributes from the user feedback) to improve one or more hybrid predictive models, and to increase the likelihood of identifying and providing relevant and quality customer support content, according to one embodiment.

Providing the feedback acquisition features 110 enables crowdsourcing of user feedback, according to one embodiment. By crowdsourcing user feedback, the question and answer customer support system can improve hybrid predictive models that rely on both user feedback (e.g., crowdsourced user feedback) and machine learning techniques, according to one embodiment. The user feedback can be structured (e.g., Boolean, multiple-choice, finite choices, etc.) or can be unstructured (e.g., text entered into a text box), according to one embodiment. The user feedback can be used to define features and/or attributes of the customer support content that are important to users or that might enable a hybrid predictive model to better match customer support content with the search query 101, according to one embodiment.

The features and/or attributes that are identified by machine learning techniques and by crowdsourced user feedback include characteristics of the customer support content (e.g., search query, response, reference materials, and related search queries/responses), according to one embodiment. The features and/or attributes of the customer support content include, but are not limited to, length of search query, length of response, tone/sentiment of search query, tone/sentiment of response, topic of search query, topic of response, quality of writing of search query, quality of writing of response, relevance of search query to the user's search query, relevance of response to the search query, relevance of the response to the user's search query, punctuation of the search query, punctuation of the response, quality of grammar of the search query or response, perceived accuracy of the response, the search ranking of the combination of a search query and response, the number of responses associated with a search query, the age of the search query, the age of response, the length of reference material, the style of the reference material, the author of the search query, the author of the response, the author of the reference material, attributes of the author of the search query/response/reference material, whether the customer support content includes a hyperlink, the text size of the search query/response/reference material, back ground and/or foreground colors and/or images used to present the customer support content, font characteristics of the customer support content, whether the details/context are provided with the search query, whether the user felt like the customer support content was helpful, the number of other users who found the customer support content helpful, the number of customers who viewed the customer support content, the number of similar questions displayed with the customer support content, and the like, according to one embodiment.

The feedback acquisition features 110 include user experience elements 112, user experience elements 114, user experience elements 116, and/or user experience elements 118, according to one embodiment. The user experience elements 112 include the text "answer helpful?", a "yes" button, and a "no" button for acquiring structured user feedback about the relevance and/or quality of an answer (e.g., customer support content 106), according to one embodiment. The user experience elements 114 include the text "answer quality?", a "good" button, and a "poor" button, for acquiring structured user feedback about the quality of an answer (e.g., the customer support content 106), according to one embodiment. The user experience elements 114 also receive structured user feedback to facilitate extracting features and/or attributes (e.g., crowd-nominated features) of the customer support content from users, according to one embodiment. The user experience elements 116 include the text "answer accurate?", a "yes" button, and a "no" button, to acquire structured user feedback related to the customer support content, according to one embodiment. The user experience elements 118 include the text "how was the ranking of this answer (e.g., too high, just right, etc.)?", and an input text box to the receipt of unstructured user feedback, according to one embodiment. The question and answer customer support system can use a number of natural language processing, predictive model, and/or other techniques for extracting features and/or attributes about the customer support content from the user's unstructured user feedback, according to one embodiment.

The feedback acquisition features 110 enable the question and answer customer support system to solicit users for user feedback from a variety of users and using a variety of techniques, according to one embodiment. The feedback acquisition features 110 obtains user feedback from asking users regarding one or more responses the asking users received in response to their search queries, according to one embodiment. The feedback acquisition features 110 obtains user feedback from viewing users regarding reference materials and/or other customer support content that is provided by the service provider of the question and answer customer support system, according to one embodiment. The feedback acquisition features 110 obtains user feedback from viewing users regarding search queries, responses to the search queries, and/or other customer support content that is crowdsourced, according to one embodiment. In one embodiment, the question and answer customer support system uses the feedback acquisition features 110 to publish user feedback from other users, to encourage the current user to provide user feedback, according to one embodiment.

FIG. 1B illustrates an example user experience page 140 that can be provided to a user of the question and answer customer support system after a user has indicated that the customer support content 104 and/or 106 is helpful, according to one embodiment. The user experience page 140 includes feedback acquisition features 142, for acquiring user feedback from the user, to improve the likelihood of identifying and providing relevant and/or quality content to users, according to one embodiment. The question and answer customer support system improves the likelihood of identifying and providing relevant and/or quality content to users by training and/or updating one or more hybrid predictive models using features and/or attributes identified both by machine learning techniques and crowdsourced user feedback, according to one embodiment.

The feedback acquisition features 142 include user experience elements 144 and user experience elements 146, according to one embodiment. The user experience elements 144 include a text box that solicits unstructured user feedback from the user as to why the user indicated that the customer support content 104 and/or 106 was helpful, according to one embodiment. The user experience elements 144 also include a "cancel" button and a "submit" button to allow the user to provide user feedback in the text box, according to one embodiment. The user experience elements 144 enable the question and answer customer support system to extract crowd-nominated features and/or attributes about the customer support content 104 and/or the customer support content 106, to enable the question and answer customer support system to train and/or update one or more hybrid predictive models based on features and/or attributes that are identified in the crowdsourced user feedback, according to one embodiment.

The user experience elements 146 include the text, an "exemptions" button, a "social security" button, and a "neither" button, as an example implementation of user experience elements that can be used to extract crowd-nominated features and/or attributes using structured user feedback (e.g., multiple-choice user feedback), according to one embodiment. The user experience elements 146 are an example implementation of user experience elements that can be populated by one or more predictive models that determine which structured user feedback to collect about one or more segments of users, according to one embodiment. In one embodiment, the question and answer customer support system uses the structured user feedback from the user experience elements 146 to associate additional topics with the customer support content 104, 106, and/or 108 to improve future searches within the question and answer customer support system, according to one embodiment.

FIG. 1C illustrates an example user experience page 160 that can be provided to a user of the question and answer customer support system after users indicate that the customer support content 104, 106, and/or 108 is not helpful, according to one embodiment. The user experience page 160 is used to acquire structured and/or unstructured user feedback to better match the customer support content 104, 106, 108 with the search query 101, according to one embodiment. The user experience page 160 includes feedback acquisition features 162, for acquiring user feedback from users, to improve the likelihood of identifying and providing relevant and/or quality content to users, according to one embodiment. The question and answer customer support system improves the likelihood of identifying and providing relevant and/or quality content to users by training and/or updating one or more hybrid predictive models based on the user feedback acquired with, for example, the feedback acquisition features 162, according to one embodiment.

The feedback acquisition features 162 include user experience elements 164 and user experience elements 166, according to one embodiment. The user experience elements 164 solicit unstructured user feedback from the user as to why the user indicated that the customer support content 104 and/or 106 was not helpful, according to one embodiment. In one embodiment, the user experience elements 164 solicit unstructured user feedback from the user by asking, "How can we make this answer more helpful?" The user experience elements 164 can solicit unstructured, random, and/or structured feedback using a variety of other phrases and/or verbiage, according to one embodiment. The user experience elements 164 are similar to the user experience elements 144 (shown in FIG. 1B), according to one embodiment. The user experience elements 166 are similar to the user experience elements 146, according to one embodiment. The question and answer customer support system uses the feedback acquisition features 162 to extract crowd-nominated features and/or attributes for the customer support content 104, 106, and/or 108, according to one embodiment.

Architecture

Figure 2:
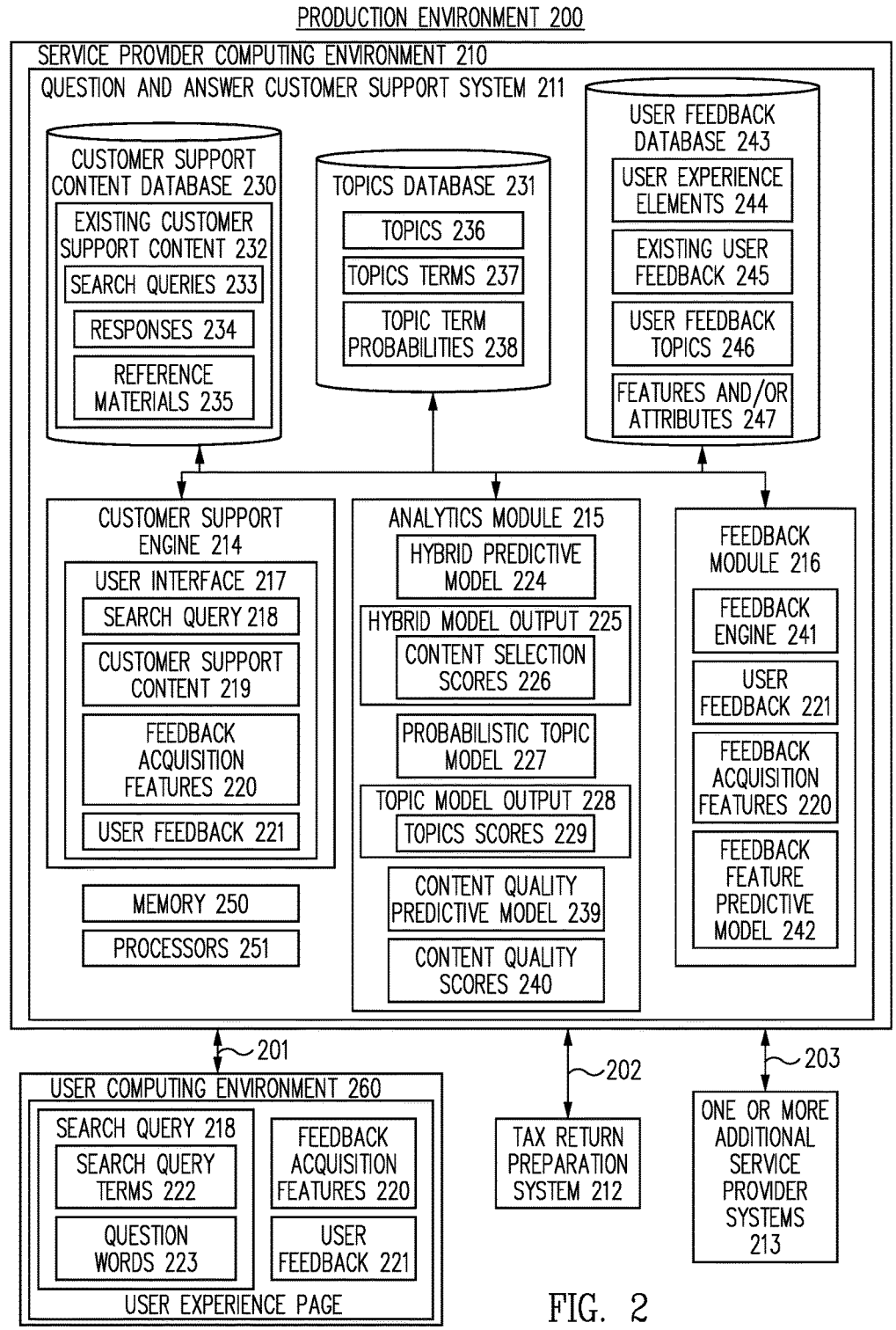
FIG. 2 is a block diagram representing one example of an architecture for improving content searching in a question and answer customer support system by using a hybrid predictive model, in accordance with one embodiment.

FIG. 2 illustrates a block diagram of a production environment 200 for improving content searching in a question and answer customer support system by using a hybrid predictive model, according to one embodiment. The production environment 200 includes a variety of engines, modules, databases, and other system elements that illustrate example embodiments of how a question and answer customer support system solicits user feedback to enable and improve the operation of a hybrid predictive model, according to one embodiment. The use of the hybrid predictive model in the question and answer customer support system facilitates identifying and providing relevant and quality customer support content to users of the question and answer customer support system, according to one embodiment. The production environment 200 uses a hybrid predictive model to improve user experiences in receiving customer support content in a question and answer customer support system. By improving user satisfaction with the question and answer customer support system, a question and answer customer support system assists the service provider in achieving business objectives such as, but not limited to, converting potential customers into paying customers and attracting potential customers to products offered by the service provider, according to one embodiment. Indeed, the task of improving self-support resources can be considered the same as increasing the user-friendliness and profitability of the products that are supported by the question and answer customer support system, according to one embodiment.

The production environment 200 uses a hybrid predictive model to identify and provide both relevant and quality customer support content in response to search queries received from users of the question and answer customer support system, according to one embodiment. The hybrid predictive model receives search queries from users and identifies (e.g., with a content quality score) customer support content that satisfies the search query received from users, according to one embodiment. The hybrid predictive model is a hybrid because it is trained and/or updated with both information obtained via machine learning and information obtained from user feedback (e.g., structured and/or unstructured user feedback), according to one embodiment.

Because hybrid predictive models can provide better performance than search engines or predictive models that rely solely on machine learning or crowdsourced user feedback, embodiments of the present disclosure employ functionality of a hybrid predictive model to improve content searching (inclusive of identifying and providing content) in a question and answer customer support system, according to one embodiment.

The production environment 200 includes a service provider computing environment 210 and a user computing environment 260 for improving content searching in a question and answer customer support system by using a hybrid predictive model, according to one embodiment. The service provider computing environment 210 is communicatively coupled to the user computing environment 260 through a communication channel 201 (e.g., the Internet), according to one embodiment. The service provider computing environment 210 includes a question and answer customer support system 211 that is associated with and/or configured to support a tax return preparation system 212 and/or one or more additional service provider systems 213, according to one embodiment. The question and answer customer support system 211, the tax return preparation system 212, and the one or more additional service provider systems 213 are systems (e.g., software systems) that are communicatively coupled to each other through communications channels 202 and 203, according to one embodiment. As noted above, herein, the term system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of implementations of the question and answer customer support system 211, the tax return preparation system 212, and the one or more additional service provider systems 213 include, but are not limited to the following: TurboTax AnswerXchange® available from Intuit, Inc. of Mountain View, Calif.; TurboTax® available from Intuit, Inc. of Mountain View, Calif.; TurboTax Online™ available from Intuit, Inc. of Mountain View, Calif.; Quicken®, available from Intuit, Inc. of Mountain View, Calif.; Quicken Online™, available from Intuit, Inc. of Mountain View, Calif.; QuickBooks®, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

In one embodiment the question and answer customer support system 211, e.g., a social question and answer system, is provided to support users of the tax return preparation system 212 and/or one or more additional service provider systems 213. The question and answer customer support system 211 includes a customer support engine 214, an analytics module 215, and a feedback module 216, for facilitating/improving content searching in the question and answer customer support system 211 by using a hybrid predictive model, according to one embodiment.

The customer support engine 214 includes a user interface 217 for interacting with the user computing environment 260, according to one embodiment. The customer support engine 214 is configured to receive information from the user computing environment 260 and is configured to provide information to the user computing environment 260, to facilitate interaction between a user and the question and answer customer support system 211, according to one embodiment. The user interface 217 includes, but is not limited to one or more data entry fields; question quality indicators; images; backgrounds; avatars; highlighting mechanisms; icons; boxes; slides; buttons; and any other user interface elements or features that individually, or in combination, create a user experience, as discussed herein, and/or as known in the art at the time of filing, and/or as developed after the time of filing. The user interface 217 is a user experience display and/or includes one or more user experience pages, according to one embodiment. The customer support engine 214 uses the user interface 217 to receive all or part of a search query 218 from a user, to provide customer support content 219 to a user, to provide feedback acquisition features 220 to a user, and to receive user feedback 221 from a user, according to one embodiment.

The customer support engine 214 and/or the question and answer customer support system 211 uses the search query 218, the customer support content 219, the feedback acquisition features 220, and the user feedback 221 to improve the likelihood that the customer support content 219 adequately answers questions and/or concerns of the users who submit the search query 218, according to one embodiment. The customer support engine 214 and/or the question and answer customer support system 211 provide the search query 218 to the analytics module 215 to determine which customer support content 219 to provide to the user computing environment 260, in response to the search query 218, according to one embodiment. When the customer support engine 214 and/or the question and answer customer support system 211 provides the search query 218 to the analytics module 215, the analytics module 215 applies one or more predictive models (e.g., a hybrid predictive model) to the search query 218 to identify and/or define the customer support content 219 that the customer support engine 214 provides to the user computing environment 260, in response to the search query 218, according to one embodiment.

The customer support engine 214 and/or the question and answer customer support system 211 provide feedback acquisition features 220 along with the customer support content 219 in order to receive user feedback 221 regarding the quality and/or relevance of the customer support content 219, according to one embodiment. The customer support engine 214 and/or the question and answer customer support system 211 receive the feedback acquisition features 220 from the feedback module 216, according to one embodiment. The customer support engine 214 receives the feedback acquisition features 220 from the feedback module 216, in response to providing one or more of the search query 218 and the customer support content 219 to the feedback module 216, according to one embodiment. The customer support engine 214 receives the feedback acquisition features 220 from the feedback module 216, in response to providing (to the feedback module 216) user characteristics (e.g., age, education level, job, employment status, usage history, estimated salary range, zip code, etc.) of the user that submits the search query 218 and/or browsing behavior of the user that submits the search query 218, according to one embodiment. The customer support engine 214 and/or the question and answer customer support system 211 receive the user feedback 221, in response to providing the feedback acquisition features 220 to the user computing environment 260 while providing the customer support content 219 to the user of the user computing environment 260, according to one embodiment.

The analytics module 215 identifies and/or at least partially determines the customer support content 219 in response to receiving the search query 218, according to one embodiment. The analytics module 215 identifies and/or determines the customer support content 219 by applying the search query 218 to a hybrid predictive model 224, according to one embodiment. The analytics module 215 applies the search query 218 to the hybrid predictive model 224, to cause the hybrid predictive model 224 to generate hybrid model output 225, according to one embodiment. The hybrid model output 225 is representative of a selection and/or ranking of one or more existing customer support content that satisfies the search query 218, according to one embodiment. The hybrid model output 225 includes content selection scores 226 that are representative of a relevance, a quality, and/or a ranking of existing customer support content 232 that is at least partially used to determine the customer support content 219, according to one embodiment. In one embodiment, the most relevant customer support content is the customer support content that has the highest quality (e.g., quality of writing style, number of up votes, etc.) of one or more relevant customer support content. In one embodiment, the analytics module 215 provides the customer support engine 214 and/or the question and answer customer support system 211 with the hybrid model output 225 and/or the content selection scores 226 to enable the customer support engine 214 and/or the question and answer customer support system 211 to define/populate the customer support content 219 that is delivered to the user computing environment 260, according to one embodiment.

The hybrid predictive model 224 is a predictive model that is trained to generate customer support content 219 at least partially based on search query 218, according to one embodiment. The hybrid predictive model 224 is a hybrid model because it is generated by applying predictive model generation operations to the existing customer support content using features and/or attributes of the existing customer support content that are identified both by machine learning and crowdsourced user feedback, according to one embodiment. The features and/or attributes for the existing customer support content 232 are extracted from crowdsourced user feedback for search queries, responses, reference materials, and other existing customer support content, according to one embodiment. The features and/or attributes for the existing customer support content 232 are extracted with machine learning techniques by applying the existing customer support content 232 to a probabilistic topic model, to determine the topics of the existing customer support content 232, according to one embodiment. The features and/or attributes for the existing customer support content 232 are extracted with machine learning techniques by applying the existing customer support content 232 to a content quality predictive model that estimates the quality of search queries and responses based on the question words 223 of the search query 218, search query terms 222 of the search query 218, the question format, answer content, and/or answer format that makeup the existing customer support content 232, according to one embodiment.

The output of the probabilistic topic model enables the question and answer customer support system 211 to estimate the relevance of the existing customer support content 232 (e.g., by determining topics that are related to the existing customer support content), according to one embodiment. The output of the content quality predictive model enables the question and answer customer support system 211 to estimate a likelihood that a question and/or an answer will be liked by asking users and/or viewing users, according to one embodiment. The crowdsourced user feedback (e.g., the user feedback 221) enables the question and answer customer support system 211 to determine users' valuation of the quality and/or relevancy of the existing customer support content 232 (e.g., as it applies to users' search queries), according to one embodiment. By combining the quality of the existing customer support content 232 as determined by machine learning, the quality of the existing customer support content 232 as determined by crowdsourced user feedback, the relevancy of existing customer support content 232 as determined by machine learning, and the relevancy of existing customer support content 232 as determined by crowdsourced user feedback, the hybrid predictive model 224 and/or the analytics module 215 can determine customer support content 219 for the search query 218 that is more relevant (and better user-perceived quality) than if the customer support content 219 is determined by machine learning alone or user feedback alone, according to one embodiment.

The question and answer customer support system 211 applies one or more predictive model generation operations to the machine learned features and/or attributes, to the crowdsourced features and/or attributes, and to the existing customer support content 232 to generate the hybrid predictive model 224, according to one embodiment. In one embodiment, the hybrid predictive model 224 is generated by applying logistic regression and/or random forest algorithms to the machine learned features and/or attributes, to the crowdsourced features and/or attributes, and to the existing customer support content 232, according to one embodiment. In one embodiment, the hybrid predictive model 224 is generated using one or more of a variety of machine learning techniques including, but not limited to, regression, logistic regression, decision trees, artificial neural networks, support vector machines, linear regression, nearest neighbor methods, distance based methods, naive Bayes, linear discriminant analysis, k-nearest neighbor algorithm, according to one embodiment.

The analytics module 215 uses a probabilistic topic model 227 to determine features and/or attributes of the existing customer support content 232, according to one embodiment. The probabilistic topic model 227 identifies topics, topic terms, and topic term probabilities that are hidden in documents or other text, according to one embodiment. The analytics module 215 applies the search query 218 to the probabilistic topic model 227 to determine which one or more topics are relevant to the search query 218, according to one embodiment. The analytics module 215 applies the probabilistic topic model 227 to the existing customer support content 232 to determine topics, topic terms, and topic term probabilities that are relevant to the existing customer support content 232, according to one embodiment. The analytics module 215 matches the search query 218 with portions of the existing customer support content 232, at least partially based on topics that are common to the search query 218 and to the existing customer support content 232, according to one embodiment. The probabilistic topic model 227 generates topic model output 228, which includes topics scores 229, according to one embodiment. The topics scores 229 are associated with topic terms and probabilistic topic terms scores that are related to one more topics, and are used to determine relevant customer support content for the search query 218, according to one embodiment.

The analytics module 215 uses a customer support content database 230 as input for the probabilistic topic model 227 and uses a topics database 231 to store the output of the probabilistic topic model 227, according to one embodiment. The customer support content database 230 includes existing customer support content 232, according to one embodiment. The existing customer support content 232 includes search queries 233 and responses 234, according to one embodiment. The search queries 233 are search queries received by the question and answer customer support system 211 from users who submitted the search queries 233 to receive the responses 234 from an online community that generates the responses 234, according to one embodiment. The existing customer support content 232 also includes reference materials 235 that are provided, for example, by the service provider of the service provider computing environment 210, according to one embodiment. The reference materials 235 include whitepapers, presentations, tutorials, multimedia presentations (e.g., instructional movies), and other materials that provide information that educates users and/or addresses the search queries 233 and 218, according to one embodiment. In one embodiment, a question is a subset of a search query. In other words, a search query may include a number of search query terms, without question words (e.g., what, where, when, why, how), according to one embodiment. Thus, the search queries 233 and the search query 218 may include parts but not all of a "question", according to one embodiment.

The analytics module 215 uses the probabilistic topic model 227 to populate the topics database 231, according to one embodiment. The analytics module 215 and/or the question and answer customer support system 211 applies the existing customer support content 232 to the probabilistic topic model 227, according to one embodiment. In response to receiving the existing customer support content 232, the probabilistic topic model 227 generates topics 236, topic terms 237, and topic term probabilities 238, according to one embodiment. In one embodiment, the analytics module 215 and/or the question and answer customer support system 211 determine how many topics the probabilistic topic model 227 should search for, and the topics 236 represent a predetermined number of topics that the probabilistic topic model 227 identifies within the existing customer support content 232, according to one embodiment. In one embodiment, the probabilistic topic model is a Latent Dirichlet allocation ("LDA") algorithm.

The analytics module 215 uses content quality predictive model 239 to determine features and/or attributes of the existing customer support content 232, according to one embodiment. In one embodiment, the content quality predictive model 239 determines features and/or attributes of the existing customer support content 232 that estimates or relates to the quality of the existing customer support content 232. The content quality predictive model 239 analyzes question words 223, search query terms 222, the question format, the response format, and/or response content to estimate the likelihood that a question will receive a satisfactory response and/or to estimate the likelihood that a response will be well-received (e.g. quantified by up votes and down votes by asking users and viewing users), according to one embodiment. The content quality predictive model 239 generates content quality scores 240 that represent the quality of each of the entries in the existing customer support content 232, according to one embodiment. The analytics module 215 uses the content quality scores 240, or other output from the content quality predictive model 239 to identify features and/or attributes of the existing customer support content 232 that estimate the quality of the existing customer support content 232, according to one embodiment. The analytics module 215 uses the content quality scores 240 to at least partially train the hybrid predictive model 224, according to one embodiment.

The hybrid predictive model 224 is trained based on attributes/features that are identified by machine learning techniques and that are identified from crowdsourcing user feedback, according to one embodiment. The feedback module 216 provides crowdsourced user feedback 221 that enables the analytics module 215 and/or the question and answer customer support system 211 to train the hybrid predictive model 224, according to one embodiment. The feedback module 216 includes a feedback engine 241, the user feedback 221, the feedback acquisition features 220, and a feedback feature predictive model 242, according to one embodiment.

The feedback engine 241 populates the feedback acquisition features 220 using the user feedback database 243, according to one embodiment. The feedback engine 241 populates the feedback acquisition features 220 at least partially based on the search query 218 and/or the customer support content 219, according to one embodiment. The feedback engine 241 populates the feedback acquisition features 220 based on user characteristics of the user that submitted the search query 218 and/or based on the browsing behaviors/history of the user within the question and answer customer support system 211, according to one embodiment. The feedback engine 241 populates the feedback acquisition features 220 with the user experience elements 244, according to one embodiment. The user experience elements 244 include buttons, text boxes, menus, slides, radio buttons, audio/video media, pictures, diagrams, avatars, text, and/or other user experience elements, according to one embodiment.

The feedback engine 241 populates the user feedback database 243 with existing user feedback 245, according to one embodiment. The existing user feedback 245 is determined by saving the user feedback 221 to the user feedback database 243 each time the user feedback 221 is received from a user, according to one embodiment.

The feedback module 216 also stores the user feedback topics 246 in the user feedback database 243, according to one embodiment. The user feedback topics 246 are determined by analyzing the user feedback 221 with the probabilistic topic model 227, according to one embodiment. The feedback engine 241 applies the user feedback 221 to the probabilistic topic model 227 to receive and store the user feedback topics 246 in the user feedback database 243, according to one embodiment. The user feedback 221 may be relevant to the customer support content 219, or may be irrelevant to the customer support content 219. In one embodiment, the existing user feedback 245 includes user feedback topics 246 that are indicative of the user feedback 221 that is (e.g., topically) relevant to the customer support content 219, according to one embodiment. The user feedback topics 246 can be indicative of the topics that the user believes the customer support content 219 pertains to, according to one embodiment. If the feedback acquisition features 220 solicits the user feedback topics 246 from the user, the user feedback topics 246 can be associated with the existing customer support content 232 and/or the customer support content 219, to improve the ability of the hybrid predictive model 224 to select relevant customer support content 219 for the search query 218, according to one embodiment. The user feedback topics 246 are a subset of the existing user feedback 245, according to one embodiment. The user feedback topics 246 are acquired from the user by providing one or more discrete topics in the feedback acquisition features 220 for the user to select from, according to one embodiment. In one embodiment, the feedback engine 241 includes selection buttons with two topics for the user to select from within the feedback acquisition features 220, to solicit from the user which of the two topics the user believes is more relevant to the customer support content 219, according to one embodiment.

The feedback module 216, the feedback engine 241, and/or the question and answer customer support system 211 applies the user feedback 221 and/or the existing user feedback 245 to the analytics module 215 to extract features and/or attributes 247 from the user feedback, according to one embodiment. The features and/or attributes 247 can be used to train the hybrid predictive model 224 to improve the relevancy determinations and/or the quality determinations of existing customer support content 232, according to one embodiment.

The feedback module 216 uses the feedback feature predictive model 242 to determine which user experience elements 244 and/or which user feedback topics 246 to provide to the user when soliciting user feedback 221, according to one embodiment. The feedback feature predictive model 242 is configured to determine which user experience elements 244 and/or user feedback topics 246 to provide in the feedback acquisition features 220 at least partially based on user characteristics of the user that submits the search query 218, according to one embodiment. For example, the feedback feature predictive model 242 can be a decision tree or other type of predictive model that segments users into groups based on common user characteristics, browsing behavior, or other attributes (e.g., acquired from clickstream data), according to one embodiment. The feedback feature predictive model 242 is trained to identify which of the user experience elements 244 and user feedback topics 246 are more likely to be effective for particular segments of users (e.g., users having one or more particular characteristics/attributes), according to one embodiment. By employing the feedback feature predictive model 242 to populate the feedback acquisition features 220, the feedback engine 241 and/or the question and answer customer support system 211 customize the feedback acquisition process, potentially enabling the question and answer customer support system 211 to acquire more information and/or higher-quality information in the user feedback 221, according to one embodiment.

In one embodiment, the user feedback 221 and/or existing user feedback 245 is associated with existing customer support content 232, and is published in the customer support content 219 to increase a likelihood of user engagement and to increase a likelihood of obtaining user feedback 221, according to one embodiment. For example, user feedback such as up votes, down votes, user comments, unstructured user feedback, quality assessment, relevance assessments, and other types of user feedback are displayed with customer support content 219 for subsequent users of the question and answer customer support system 211, according to one embodiment. By publishing at least part of the user feedback 221 and/or the existing user feedback 245 with the customer support content 219, subsequent users may be encouraged to contribute their own user feedback 221, which enables the question and answer customer support system 211 to further train, update, and/or optimize the hybrid predictive model 224, according to one embodiment.

The question and answer customer support system 211 is represented by instructions and other data that is stored in memory 250 and is executed by one or more of processors 251, according to one embodiment.

Process

Figure 3:
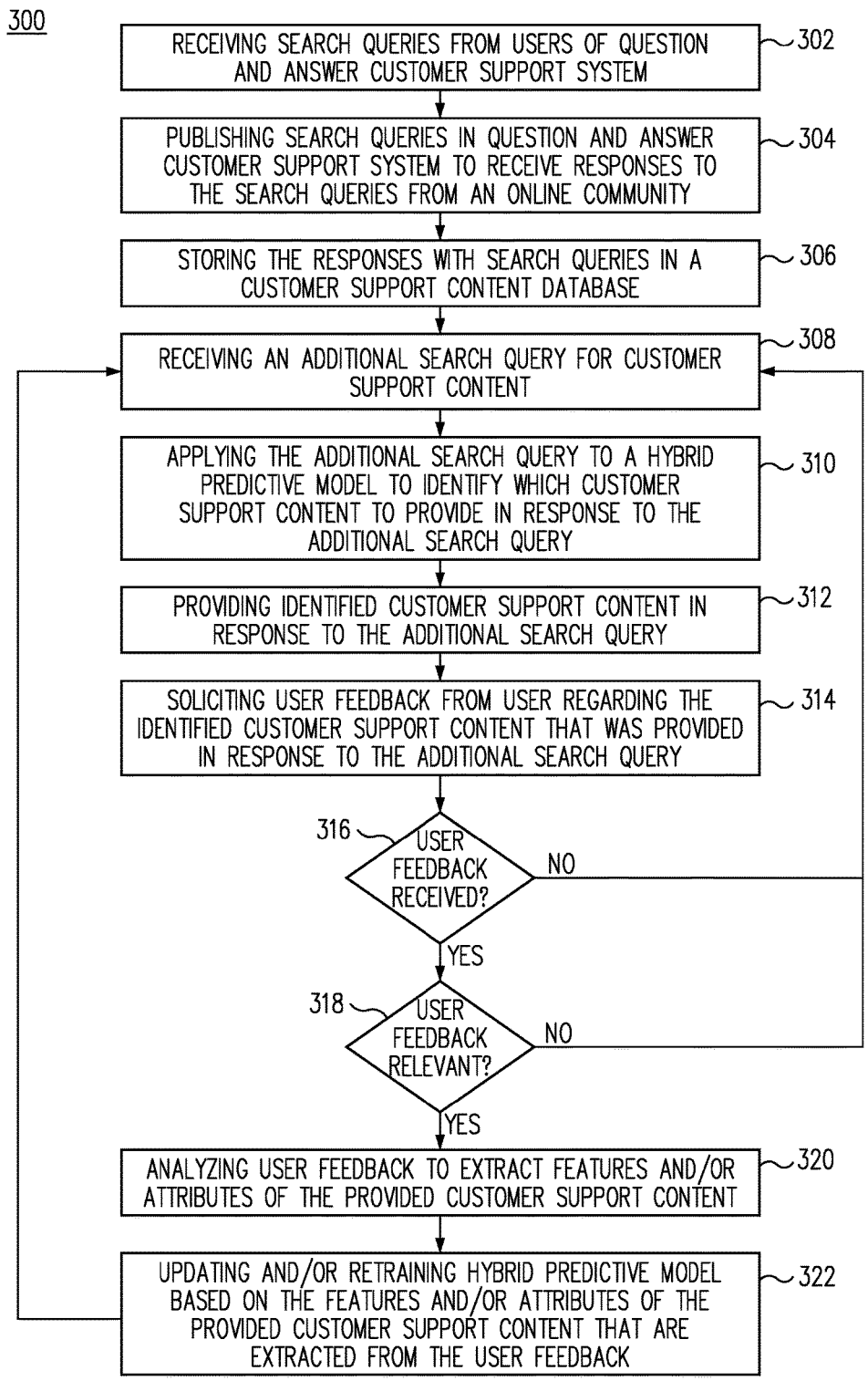
FIG. 3 is a flow diagram that illustrates an example of a process for using a hybrid predictive model to respond to search queries for customer support content in a question and answer customer support system, in accordance with one embodiment.

FIG. 3 is a flow diagram of a process 300 for using a hybrid predictive model to respond to search queries for customer support content in a question and answer customer support system, according to one embodiment.

At operation 302, the process includes receiving search queries from users of question and answer customer support system, according to one embodiment. Operation 302 proceeds to operation 304, according to one embodiment.

At operation 304, the process includes publishing search queries in a question and answer customer support system to receive responses to the search queries from an online community, according to one embodiment. Operation 304 proceeds to operation 306, according to one embodiment.

At operation 306, the process includes storing the responses with the search queries in a customer support content database, according to one embodiment. Operation 306 proceeds to operation 308, according to one embodiment.

At operation 308, the process includes receiving an additional search query for customer support content, according to one embodiment. Operation 308 proceeds to operation 310, according to one embodiment.

At operation 310, the process includes applying the additional search query to a hybrid predictive model to identify which customer support content to provide in response to the additional search query, according to one embodiment. Operation 310 proceeds to operation 312, according to one embodiment.

At operation 312, the process includes providing identified customer support content in response to the additional search query, according to one embodiment. Operation 312 proceeds to operation 314, according to one embodiment.

At operation 314, the process includes soliciting user feedback from user regarding the identified customer support content that was provided in response to the additional search query, according to one embodiment. Operation 314 proceeds to operation 316, according to one embodiment.

At operation 316, the process includes determining if user feedback has been received, according to one embodiment. If user feedback has not been received, operation 316 proceeds to operation 308, according to one embodiment. If user feedback has been received, operation 316 proceeds to operation 318, according to one embodiment.

At operation 318, the process includes determining if user feedback is relevant, according to one embodiment. The process applies natural language processing and/or the probabilistic topic model to the user feedback to determine if the user feedback is belligerent, vulgar, related to the customer support content (e.g., includes a similar topic), is related to a tax return preparation system, and the like, according to one embodiment. If the user feedback is not relevant, operation 318 proceeds to operation 308, according to one embodiment. If the user feedback is relevant, operation 318 proceeds to operation 320, according to one embodiment.

At operation 320, the process includes analyzing user feedback to extract features and/or attributes of the provided customer support content, according to one embodiment. Operation 320 proceeds to operation 322, according to one embodiment.

At operation 322, the process includes updating and/or retraining the hybrid predictive model based on the features and/or attributes of the provided customer support content that are extracted from the user feedback, according to one embodiment. Operation 322 proceeds to operation 308, according to one embodiment.

Figure 4:
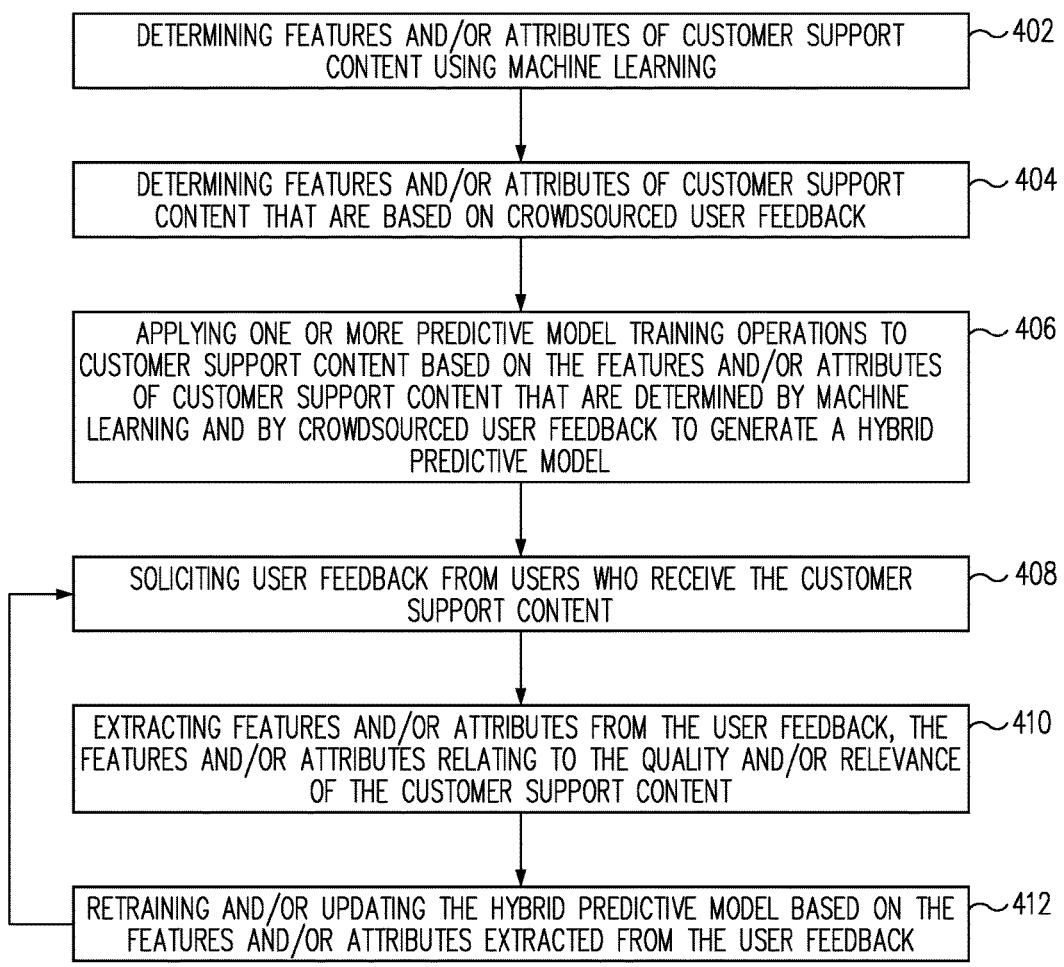
FIG. 4 is a flow diagram that illustrates an example of a process for training a hybrid predictive model, which can be used to identify customer support content that is relevant to search queries submitted to a question and answer customer support system, in accordance with one embodiment.

FIG. 4 is a flow diagram of a process 400 for training a hybrid predictive model, which can be used to identify customer support content that is relevant to search queries submitted to a question and answer customer support system, in accordance with one embodiment.

At operation 402, the process includes determining features and/or attributes of customer support content using machine learning, according to one embodiment. In one embodiment, the process determines one or more topics of the customer support content because topics are one feature of the customer support content. In one embodiment, the process determines one or more topics of the customer support content by applying the customer support content to a probabilistic topic model. In one embodiment, the process determines the likelihood that a search query and/or a response will receive an up vote because the likelihood of receiving an up vote is one feature of the customer support content. In one embodiment, the process determines the likelihood that a search query and/or a response will receive an up vote by applying the customer support content to a content quality predictive model. Operation 402 proceeds to operation 404, according to one embodiment.

At operation 404, the process includes determining features and/or attributes of customer support content that are based on crowdsourced user feedback, according to one embodiment. In one embodiment, the process determines one or more topics of the user feedback because topics are one feature of the user feedback that can be used to train and/or operate the hybrid predictive model. In one embodiment, the process applies the user feedback to a probabilistic topic model to determine one or more topics of the user feedback. In one embodiment, the process applies one or more additional natural language processing techniques/algorithms to the user feedback to extract additional features and/or attributes of the customer support content from the user feedback. Operation 404 proceeds to operation 406, according to one embodiment.

At operation 406, the process includes applying one or more predictive model training operations to customer support content based on the features and/or attributes of customer support content that are determined by machine learning and by crowdsourced user feedback to generate a hybrid predictive model, according to one embodiment. In one embodiment, the one or more predictive model training operations include logistic regression and random forest modeling. Operation 406 proceeds to operation 408, according to one embodiment.

At operation 408, the process includes soliciting user feedback from users who receive the customer support content, according to one embodiment. Operation 408 proceeds to operation 410, according to one embodiment.

At operation 410, the process includes extracting features and/or attributes from the user feedback, the features and/or attributes relating to the quality and/or relevance of the customer support content, according to various embodiments. Operation 410 proceeds to operation 412, according to one embodiment.

At operation 412, the process includes retraining and/or updating the hybrid predictive model based on the features and/or attributes extracted from the user feedback, according to one embodiment. Operation 412 proceeds to operation 408, according to one embodiment.

Figure 5A:
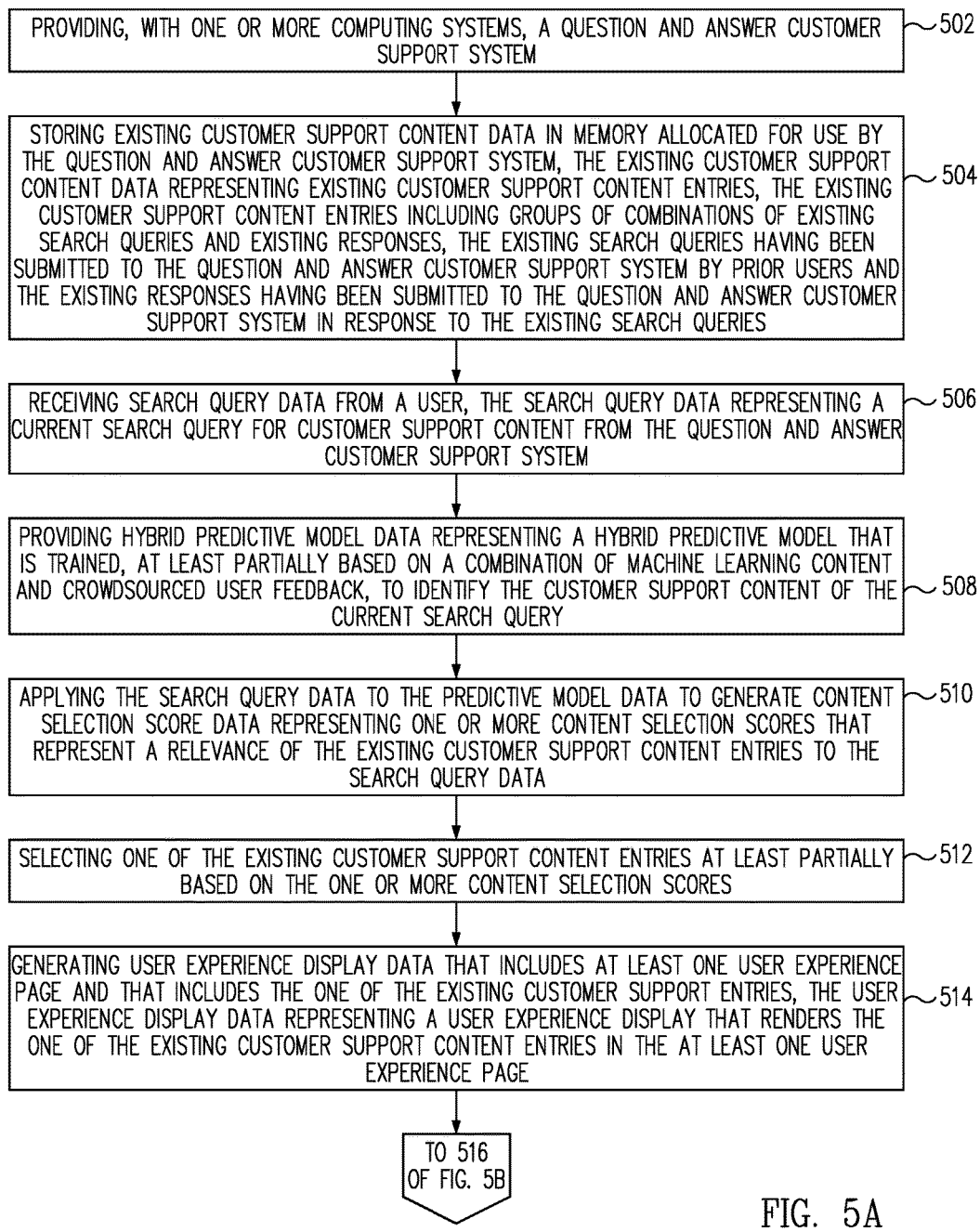
FIGS. 5A and 5B are a flow diagram that illustrates an example of a process for using a hybrid predictive model to respond to search queries for customer support content in a question and answer customer support system, in accordance with one embodiment.
Figure 5B:
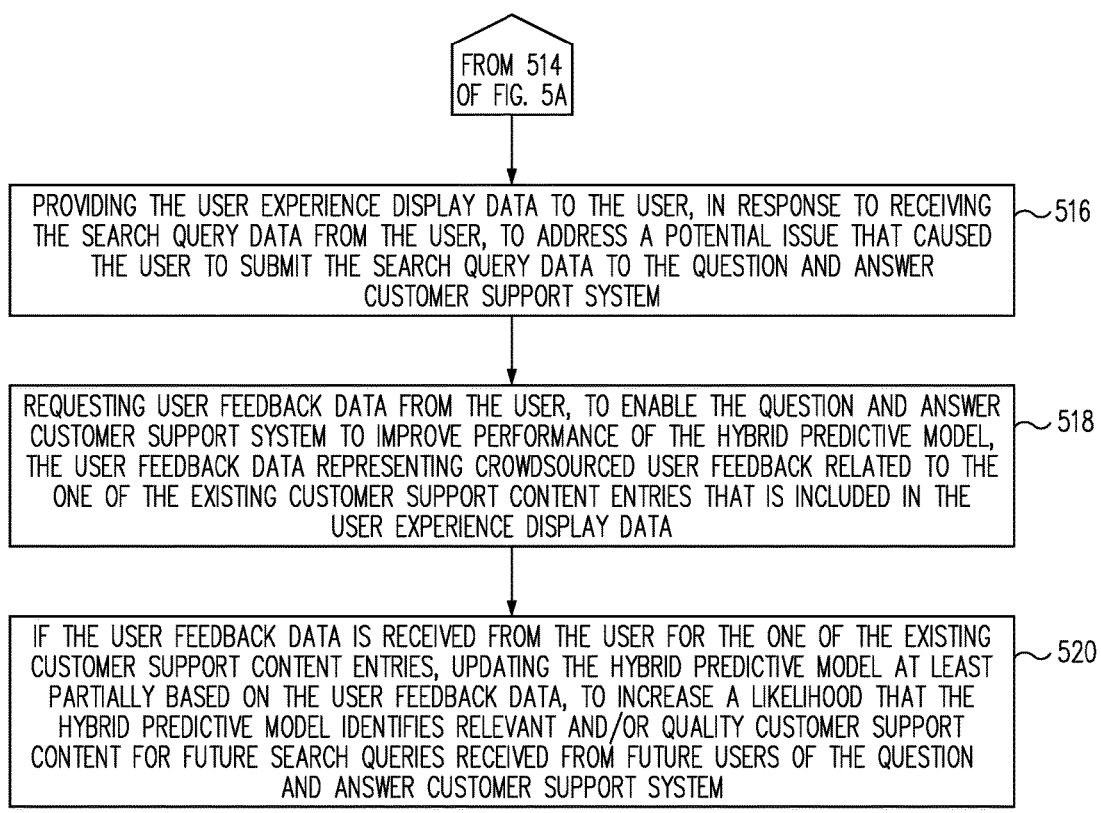

FIGS. 5A and 5B illustrate an example flow diagram of a process 500 for using a hybrid predictive model to respond to search queries for customer support content in a question and answer customer support system, according to one embodiment.

At operation 502, the process includes providing, with one or more computing systems, a question and answer customer support system, according to one embodiment. The question and answer customer support system is the question and answer customer support system 211 (shown in FIG. 2), according to one embodiment. Operation 502 proceeds to operation 504, according to one embodiment.

At operation 504, the process includes storing existing customer support content data in memory allocated for use by the question and answer customer support system, the existing customer support content data representing existing customer support content entries, the existing customer support content entries including groups of combinations of existing search queries and existing responses, the existing search queries having been submitted to the question and answer customer support system by prior users and the existing responses having been submitted to the question and answer customer support system in response to the existing search queries, according to one embodiment. Operation 504 proceeds to operation 506, according to one embodiment.

At operation 506, the process includes receiving search query data from a user, the search query data representing a current search query for customer support content from the question and answer customer support system, according to one embodiment. The current search query is a question that includes search query terms and question words (e.g., what, where, who, why, etc.), according to one embodiment. Operation 506 proceeds to operation 508, according to one embodiment.

At operation 508, the process includes providing hybrid predictive model data representing a hybrid predictive model that is trained, at least partially based on a combination of machine learning content and crowdsourced user feedback, to identify the customer support content of the current search query, according to one embodiment. The hybrid predictive model is trained in accordance with the process 400 (shown in FIG. 4), according to one embodiment. The machine learning content includes features and/or attributes of the existing customer support content that have been identified by applying one or more machine learning algorithms to the existing customer support content, according to one embodiment. The features and/or attributes are used to quantify relevance and/or quality of the customer support content (e.g., each search query, each response, and/or each combination of search query and response), according to one embodiment. Operation 508 proceeds to operation 510, according to one embodiment.

At operation 510, the process includes applying the search query data to the predictive model data to generate content selection score data representing one or more content selection scores that represent a relevance of the existing customer support content entries to the search query data, according to one embodiment. In one embodiment, applying the search query data to the predictive model to generate content selection score data includes transforming the search query data into the content selection score data through a number of algorithmic processes and/or mathematical relationships within the hybrid predictive model, according to one embodiment. Operation 510 proceeds to operation 512, according to one embodiment.

At operation 512, the process includes selecting one of the existing customer support content entries at least partially based on the one or more content selection scores, according to one embodiment. In one embodiment, the process selects the one of the existing customer support content entries has the highest content selection scores, according to one embodiment. The content selection scores represent quality of the customer support content, according to one embodiment. The content selection scores represent a relevance of the customer support content, according to one embodiment. The content selection scores represent a combination of quality and relevance of the customer support content for the search query received by the question and answer customer support system, according to one embodiment. The highest content selection score for a search query represents the most relevant (e.g., based on topic relevance closed processes customer support content that has the highest quality (e.g., based on a quality predictive model and/or based on crowdsourced user feedback), according to one embodiment. Operation 512 proceeds to operation 514, according to one embodiment.

At operation 514, the process includes generating user experience display data that includes at least one user experience page and that includes the one of the existing customer support entries, the user experience display data representing a user experience display that renders the one of the existing customer support content entries in the at least one user experience page, according to one embodiment. Each of the existing customer support entries includes at least one search query (e.g., a question) and one or more responses to the search query, according to one embodiment. Operation 514 proceeds to operation 516, according to one embodiment.

At operation 516, the process includes providing the user experience display data to the user, in response to receiving the search query data from the user, to address a potential issue that caused the user to submit the search query data to the question and answer customer support system, according to one embodiment. Operation 516 proceeds to operation 518, according to one embodiment.

At operation 518, the process includes requesting user feedback data from the user, to enable the question and answer customer support system to improve performance of the hybrid predictive model, the user feedback data representing crowdsourced user feedback related to the one of the existing customer support content entries that is included in the user experience display data, according to one embodiment. The requesting user feedback includes providing feedback acquisition features to the user, according to one embodiment. The feedback acquisition features include text boxes, buttons, switches, knobs, slides, radio buttons, menus, and other user experience elements, according to one embodiment. The feedback acquisition features enable the user to provide user feedback that represents the quality and/or the relevance of the existing customer support content entry provided to the user, according to one embodiment. The feedback acquisition features enable users to provide user feedback from which features and/or attributes of user-perceived relevance and/or quality can be extracted for training and/or updating the hybrid predictive model, according to one embodiment. Operation 518 proceeds to operation 520, according to one embodiment.

At operation 520, the process includes, if the user feedback data is received from the user for the one of the existing customer support content entries, updating the hybrid predictive model at least partially based on the user feedback data, to increase a likelihood that the hybrid predictive model identifies relevant and/or quality customer support content for future search queries received from future users of the question and answer customer support system, according to one embodiment.

The disclosed embodiments, of a method and system for improving content searching in a question and answer customer support system by using a crowd-machine learning hybrid predictive model, provide a technical solution to the long standing technical problem of how to respond to search queries with relevant and quality content (e.g., customer support content). The method and system, for improving content searching in a question and answer customer support system by using a crowd-machine learning hybrid predictive model, leverage features and/or attributes that are identified using machine learning techniques and crowdsourced user feedback, according to one embodiment. The features and/or attributes are associated with the relevance and/or quality of customer support content, and are used by to train and/or operate the hybrid predictive model, to provide users with customer support content that they are likely to be satisfied with, according to one embodiment. This, in turn, results in: less human and processor resources being dedicated to processing customer support requests; less memory and storage bandwidth being dedicated to buffering and storing complaints for poor search results; and less communication bandwidth being utilized to perform redundant searches for information.

The disclosed method and system for improving content searching in a question and answer customer support system by using a crowd-machine learning hybrid predictive model does not encompass, embody, or preclude other forms of innovation in the area of content searching and/or question and answer customer support systems. In addition, the disclosed method and system for improving content searching in a question and answer customer support system by using a crowd-machine learning hybrid predictive model is not related to any fundamental economic practice, fundamental data processing practice, mental steps, or pen and paper based solutions, and is, in fact, directed to the relatively new problem of searching customer support content in a question and answer customer support system. Consequently, the disclosed method and system for improving content searching in a question and answer customer support system by using a crowd-machine learning hybrid predictive model is not directed to, does not encompass, and is not merely, an abstract idea or concept.

In addition, the disclosed method and system for improving content searching in a question and answer customer support system by using a crowd-machine learning hybrid predictive model provides for significant improvements to the technical fields of user experience, electronic transaction data processing, financial transaction processing, electronic tax return preparation, customer support systems, data processing, and data management.

In addition, as discussed above, the disclosed method and system for improving content searching in a question and answer customer support system by using a crowd-machine learning hybrid predictive model, more accurately quantifies relevant customer support content to better satisfy the needs of a user, which results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for improving content searching in a question and answer customer support system by using a crowd-machine learning hybrid predictive model.

In accordance with an embodiment, a computing system implemented method uses a hybrid predictive model to respond to search queries for customer support content in a question and answer customer support system. The method includes providing, with one or more computing systems, a question and answer customer support system, according to one embodiment. The method includes storing existing customer support content data in memory allocated for use by the question and answer customer support system, the existing customer support content data representing existing customer support content entries, the existing customer support content entries including groups of combinations of existing search queries and existing responses, the existing search queries having been submitted to the question and answer customer support system by prior users and the existing responses having been submitted to the question and answer customer support system in response to the existing search queries, according to one embodiment. The method includes receiving search query data from a user, the search query data representing a current search query for customer support content from the question and answer customer support system, according to one embodiment. The method includes providing hybrid predictive model data representing a hybrid predictive model that is trained, at least partially based on features of the existing customer support content data, the features being determined at least partially based on crowdsourced user feedback to the existing customer support content entries, according to one embodiment. The method includes applying the search query data to the predictive model data to generate content selection score data representing one or more content selection scores that represent a likelihood of satisfaction of the user with the existing customer support entries, according to one embodiment. The method includes selecting one of the existing customer support content entries at least partially based on the one or more content selection scores, according to one embodiment. The method includes generating user experience display data that includes at least one user experience page and that includes the one of the existing customer support entries, the user experience display data representing a user experience display that renders the one of the existing customer support content entries in the at least one user experience page, according to one embodiment. The method includes providing the user experience display data to the user, in response to receiving the search query data from the user, to address a potential issue that caused the user to submit the search query data to the question and answer customer support system, according to one embodiment. The method includes requesting user feedback data from the user, to enable the question and answer customer support system to improve performance of the hybrid predictive model, the user feedback data representing crowdsourced user feedback related to the one of the existing customer support content entries that is included in the user experience display data, according to one embodiment. The method includes, if the user feedback data is received from the user for the one of the existing customer support content entries, updating the hybrid predictive model at least partially based on the user feedback data, to increase a likelihood that the hybrid predictive model identifies relevant and/or quality customer support content for future search queries received from future users of the question and answer customer support system, according to one embodiment.

In accordance with an embodiment, a system uses a hybrid predictive model to respond to search queries for customer support content in a question and answer customer support system. The system includes at least one processor, and at least one memory coupled to the at least one processor, according to one embodiment. The at least one memory stores instructions which, when executed by any set of the one or more processors, perform a process for using a hybrid predictive model to respond to search queries for customer support content in a question and answer customer support system, according to one embodiment. The process includes providing a question and answer customer support system, according to one embodiment. The process includes storing existing customer support content data representing existing customer support content entries, the existing customer support content entries including groups of combinations of existing search queries and existing responses, the existing search queries having been submitted to the question and answer customer support system by prior users and the existing responses having been submitted to the question and answer customer support system in response to the existing search queries, according to one embodiment. The process includes receiving search query data from a user, the search query data representing a current search query for customer support content from the question and answer customer support system, according to one embodiment. The process includes providing hybrid predictive model data representing a hybrid predictive model that is trained, at least partially based on a combination of machine learning content and crowdsourced user feedback, to identify the customer support content of the current search query, according to one embodiment. The process includes applying the search query data to the predictive model data to generate content selection score data representing one or more content selection scores that represent a relevance of the existing customer support content entries to the search query data, according to one embodiment. The process includes selecting one of the existing customer support content entries at least partially based on the one or more content selection scores, according to one embodiment. The process includes generating user experience display data that includes at least one user experience page and that includes the one of the existing customer support entries, the user experience display data representing a user experience display that renders the one of the existing customer support content entries in the at least one user experience page, according to one embodiment. The process includes providing the user experience display data to the user, in response to receiving the search query data from the user, to address a potential issue that caused the user to submit the search query data to the question and answer customer support system, according to one embodiment. The process includes requesting user feedback data from the user, to enable the question and answer customer support system to improve performance of the hybrid predictive model, the user feedback data representing crowdsourced user feedback related to the one of the existing customer support content entries that is included in the user experience display data, according to one embodiment. The process includes, if the user feedback data is received from the user for the one of the existing customer support content entries, updating the hybrid predictive model at least partially based on the user feedback data, to increase a likelihood that the hybrid predictive model identifies relevant and/or quality customer support content for future search queries received from future users of the question and answer customer support system, according to one embodiment.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein, are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Therefore, numerous variations, whether explicitly provided for by the specification or implied by the specification or not, may be implemented by one of skill in the art in view of this disclosure.

What is claimed is:

1. A computing system implemented method for using a hybrid predictive model to respond to search queries for customer support content in a question and answer customer support system, the method comprising:

storing existing customer support content data in memory allocated for use by a question and answer customer support system, the existing customer support content data representing existing customer support content entries having groups of combinations of existing search queries and existing responses, the existing search queries having been submitted to the question and answer customer support system by prior users and the existing responses having been submitted to the question and answer customer support system in response to the existing search queries;

receiving search query data from a user, the search query data representing a current search query for customer support content from the question and answer customer support system;

training a hybrid predictive model through unsupervised learning using at least a combination of machine learning content and crowdsourced user feedback to identify the customer support content of the current search query, resulting in hybrid predictive model data, the training at least including applying one or more additional natural language processing algorithms to the crowdsourced user feedback to extract one or more features of the customer support content from the user feedback, the training including consideration of a length of reference material and a style of a reference material;

applying the search query data to the predictive model data to generate content selection score data representing two or more content selection scores, at least one of the two or more content selection scores representing a relevance of the existing customer support content entries to the search query data, and at least one of the two or more content selection scores representing a quality of the customer support content, the quality-related content selection score being provided by a content quality predictive model;

selecting one of the existing customer support content entries at least partially based on the one or more content selection scores;

generating user experience display data that includes at least one user experience page and that includes the one of the existing customer support entries, the user experience display data representing a user experience display that renders the one of the existing customer support content entries in the at least one user experience page;

providing the user experience display data to the user, in response to receiving the search query data from the user;

requesting user feedback data from the user, to enable the question and answer customer support system to improve performance of the hybrid predictive model, the user feedback data representing crowdsourced user feedback related to the one of the existing customer support content entries that is included in the user experience display data; and updating, upon receipt of user feedback data from the user, the hybrid predictive model at least partially based on the user feedback data, the received feedback including data regarding a quality of writing, accuracy and content and search ranking.

2. The computing system implemented method of claim 1, wherein the combination of machine learning content includes features of the existing customer support content data that are identified using one or more machine learning techniques.

3. The computing system implemented method of claim 1, wherein the crowdsourced user feedback includes features of the existing customer support content data that are extracted from the crowdsourced user feedback and/or from the user feedback data.

4. The computing system implemented method of claim 1, further comprising:
    generating the hybrid predictive model data by applying one or more predictive model training operations to:
    features of the existing customer support content data that are identified by applying one or more first machine learning techniques to the existing customer support content data;
    features of the existing customer support content data that are identified by applying one or more second machine learning techniques to the crowdsourced user feedback and/or to the user feedback data; and
    the existing customer support content data.

5. The computing system implemented method of claim 4, wherein the one or more predictive model training operations are selected from a group of predictive model training operations, consisting of:
    regression;
    logistic regression;
    decision trees;
    artificial neural networks;
    support vector machines;
    linear regression;
    nearest neighbor methods;
    distance based methods;
    naive Bayes;
    linear discriminant analysis; and
    k-nearest neighbor algorithm.

6. The computing system implemented method of claim 4, wherein features of the existing customer support content data that are identified by applying one or more first machine learning techniques to the existing customer support content data, or features of the existing customer support content data that are identified by applying one or more second machine learning techniques to the crowdsourced user feedback and/or to the user feedback data, are selected from a group of features, consisting of:
    length of a search query;
    length of a response;
    tone and/or sentiment of a search query;
    tone and/or sentiment of a response;
    topic of a search query;
    topic of a response;
    quality of writing of a search query;
    quality of writing of a response;
    relevance of a search query to a user's search query;
    relevance of response to a search query;
    relevance of a response to a user's search query;
    punctuation of a search query;
    punctuation of a response;
    quality of grammar of a search query or response;
    perceived accuracy of a response;
    a search ranking of a combination of a search query and response;
    a number of responses associated with a search query;
    an age of a search query;
    an age of response;
    a length of reference material;
    a style of a reference material;
    an author of a search query;
    an author of a response;
    an author of a reference material;
    attributes of an author of a search query and/or response and/or reference material;

whether a customer support content includes a hyperlink;
a text size of a search query and/or response and/or reference material;
background and/or foreground colors and/or images used to present customer support content;
font characteristics of a customer support content;
whether a details and/or context are provided with a search query;
whether a user felt like a customer support content was helpful;
a number of other users who found a customer support content helpful;
a number of customers who viewed a customer support content;
a type of reference material; and
a number of similar questions displayed with a customer support content.

7. The computing system implemented method of claim 1, wherein the existing customer support content entries include customer support reference materials including one or more customer support articles, customer support dictionaries, and customer support self-help guides.

8. The computing system implemented method of claim 1, wherein the combination of machine learning content includes features of the existing customer support content data that are identified using a probabilistic topic model that is at least partially based on a Latent Dirichlet allocation algorithm.

9. The computing system implemented method of claim 1, wherein requesting the user feedback data includes displaying feedback acquisition features in the at least one user experience page, the feedback acquisition features including one or more of:
  structured feedback user experience elements configured to determine if the user thought the one of the existing customer support content entries was useful;
  unstructured feedback user experience elements configured to determine if the user thought the one of the existing customer support content entries was useful;
  structured feedback user experience elements configured to determine if the user thought the one of the existing customer support content entries was accurate;
  unstructured feedback user experience elements configured to determine if the user thought the one of the existing customer support content entries was accurate;
  structured feedback user experience elements configured to determine if the user thought the one of the existing customer support content entries was relevant;
  unstructured feedback user experience elements configured to determine if the user thought the one of the existing customer support content entries was relevant;
  structured feedback user experience elements configured to determine if the user thought the one of the existing customer support content entries was well-written;
  unstructured feedback user experience elements configured to determine if the user thought the one of the existing customer support content entries was well-written;
  structured feedback user experience elements configured to determine which topic the user thought the one of the existing customer support content entries was related to; and
  unstructured feedback user experience elements configured to determine which topic the user thought the one of the existing customer support content entries was related to.

10. The computing system implemented method of claim 9, wherein at least part of the feedback acquisition features are selected using a feedback acquisition predictive model that selects user experience elements at least partially based on the search query data and/or user characteristics of the user.

11. A computing system implemented method for using a hybrid predictive model to respond to search queries for customer support content in a question and answer customer support system, the method comprising:
  storing existing customer support content data in memory allocated for use by a question and answer customer support system, the existing customer support content data representing existing customer support content entries, the existing customer support content entries including groups of combinations of existing search queries and existing responses, the existing search queries having been submitted to the question and answer customer support system by prior users and the existing responses having been submitted to the question and answer customer support system in response to the existing search queries;
  receiving search query data from a user, the search query data representing a current search query for customer support content from the question and answer customer support system;
  training a hybrid predictive model through unsupervised learning using at least a combination of machine learning content and crowdsourced user feedback to identify the customer support content of the current search query, resulting in hybrid predictive model data, the training at least including applying one or more additional natural language processing algorithms to the crowdsourced user feedback to extract one or more features of the customer support content from the user feedback, the training including consideration of a length of reference material and a style of a reference material;
  applying the search query data to the predictive model data to generate content selection score data representing two or more content selection scores that represent a likelihood of satisfaction of the user with the existing customer support entries, at least one of the two or more content selection scores representing a quality of the customer support content, the quality-related content selection score being provided by a content quality predictive model;
  selecting one of the existing customer support content entries at least partially based on the one or more content selection scores;
  generating user experience display data that includes at least one user experience page and that includes the one of the existing customer support entries, the user experience display data representing a user experience display that renders the one of the existing customer support content entries in the at least one user experience page;
  providing the user experience display data to the user, in response to receiving the search query data from the user;
  requesting user feedback data from the user, to enable the question and answer customer support system to improve performance of the hybrid predictive model, the user feedback data representing crowdsourced user feedback related to the one of the existing customer support content entries that is included in the user experience display data; and updating, upon receipt of user feedback data from the user, the hybrid predictive model at least partially based on the user feedback data, the received feedback including data regarding a quality of writing, perceived accuracy or content and search ranking.

12. The computing system implemented method of claim 11, further comprising:
generating the hybrid predictive model data by applying one or more predictive model training operations to:
the features being determined at least partially based on crowdsourced user feedback to the existing customer support content entries; and
the existing customer support content data.

13. The computing system implemented method of claim 11, wherein the features are selected from a group of features, consisting of:
length of a search query;
length of a response;
tone and/or sentiment of a search query;
tone and/or sentiment of a response;
topic of a search query;
topic of a response;
quality of writing of a search query;
quality of writing of a response;
relevance of a search query to a user's search query;
relevance of response to a search query;
relevance of a response to a user's search query;
punctuation of a search query;
punctuation of a response;
quality of grammar of a search query or response;
perceived accuracy of a response;
a search ranking of a combination of a search query and response;
a number of responses associated with a search query;
an age of a search query;
an age of response;
a length of reference material;
a style of a reference material;
an author of a search query;
an author of a response;
an author of a reference material;
attributes of an author of a search query and/or response and/or reference material;
whether a customer support content includes a hyperlink;
a text size of a search query and/or response and/or reference material;
background and/or foreground colors and/or images used to present customer support content;
font characteristics of a customer support content;
whether a details and/or context are provided with a search query;
whether a user felt like a customer support content was helpful;
a number of other users who found a customer support content helpful;
a number of customers who viewed a customer support content; and
a number of similar questions displayed with a customer support content.

14. The computing system implemented method of claim 11, wherein requesting the user feedback data includes displaying feedback acquisition features in the at least one user experience page, the feedback acquisition features including one or more of:
structured feedback user experience elements configured to determine if the user thought the one of the existing customer support content entries was useful;
unstructured feedback user experience elements configured to determine if the user thought the one of the existing customer support content entries was useful;
structured feedback user experience elements configured to determine if the user thought the one of the existing customer support content entries was accurate;
unstructured feedback user experience elements configured to determine if the user thought the one of the existing customer support content entries was accurate;
structured feedback user experience elements configured to determine if the user thought the one of the existing customer support content entries was relevant;
unstructured feedback user experience elements configured to determine if the user thought the one of the existing customer support content entries was relevant;
structured feedback user experience elements configured to determine if the user thought the one of the existing customer support content entries was well-written;
unstructured feedback user experience elements configured to determine if the user thought the one of the existing customer support content entries was well-written;
structured feedback user experience elements configured to determine which topic the user thought the one of the existing customer support content entries was related to; and
unstructured feedback user experience elements configured to determine which topic the user thought the one of the existing customer support content entries was related to.

15. The computing system implemented method of claim 14, wherein at least part of the feedback acquisition features are selected using a feedback acquisition predictive model that selects user experience elements at least partially based on the search query data and/or user characteristics of the user.

16. The computing system implemented method of claim 11, wherein the features are determined at least partially based on applying machine learning techniques to the existing customer support content entries.

17. A system for using a hybrid predictive model to respond to search queries for customer support content in a question and answer customer support system, the system comprising:
at least one processor; and
at least one memory coupled to the at least one processor, the at least one memory having stored therein instructions which, when executed by any set of the one or more processors, perform a process for using a hybrid predictive model to respond to search queries for customer support content in a question and answer customer support system, the process including:
storing existing customer support content data representing existing customer support content entries, the existing customer support content entries including groups of combinations of existing search queries and existing responses, the existing search queries having been submitted to the question and answer customer support system by prior users and the existing responses having been submitted to a question and answer customer support system in response to the existing search queries;
receiving search query data from a user, the search query data representing a current search query for customer support content from the question and answer customer support system;

training a hybrid predictive model through unsupervised learning using at least a combination of machine learning content and crowdsourced user feedback to identify the customer support content of the current search query, resulting in hybrid predictive model data, the training at least including applying one or more additional natural language processing algorithms to the crowdsourced user feedback to extract one or more features of the customer support content from the user feedback, the training including consideration of a length of reference material and a style of a reference material;

applying the search query data to the predictive model data to generate content selection score data representing two or more content selection scores, at least one of the two or more content selection scores representing a relevance of the existing customer support content entries to the search query data, at least one of the two or more content selection scores representing a quality of the customer support content, the quality-related content selection score being provided by a content quality predictive model;

selecting one of the existing customer support content entries at least partially based on the one or more content selection scores;

generating user experience display data that includes at least one user experience page and that includes the one of the existing customer support entries, the user experience display data representing a user experience display that renders the one of the existing customer support content entries in the at least one user experience page;

providing the user experience display data to the user, in response to receiving the search query data from the user;

requesting user feedback data from the user, to enable the question and answer customer support system to improve performance of the hybrid predictive model, the user feedback data representing crowdsourced user feedback related to the one of the existing customer support content entries that is included in the user experience display data; and updating, upon receipt of user feedback data from the user, the hybrid predictive model at least partially based on the user feedback data, the received feedback including data regarding a quality of writing, perceived accuracy or content and search ranking.

18. The system of claim 17, wherein the combination of machine learning content includes features of the existing customer support content data that are identified using one or more machine learning techniques.

19. The system of claim 17, wherein the crowdsourced user feedback includes features of the existing customer support content data that are extracted from the crowdsourced user feedback and/or from the user feedback data.

20. The system of claim 17, wherein the process further comprises:
generating the hybrid predictive model data by applying one or more predictive model training operations to:
features of the existing customer support content data that are identified by applying one or more first machine learning techniques to the existing customer support content data;
features of the existing customer support content data that are identified by applying one or more second machine learning techniques to the crowdsourced user feedback and/or to the user feedback data; and
the existing customer support content data.

21. The system of claim 20, wherein features of the existing customer support content data that are identified by applying one or more first machine learning techniques to the existing customer support content data, or features of the existing customer support content data that are identified by applying one or more second machine learning techniques to the crowdsourced user feedback and/or to the user feedback data, are selected from a group of features, consisting of:
length of a search query;
length of a response;
tone and/or sentiment of a search query;
tone and/or sentiment of a response;
topic of a search query;
topic of a response;
quality of writing of a search query;
quality of writing of a response;
relevance of a search query to a user's search query;
relevance of response to a search query;
relevance of a response to a user's search query;
punctuation of a search query;
punctuation of a response;
quality of grammar of a search query or response;
perceived accuracy of a response;
a search ranking of a combination of a search query and response;
a number of responses associated with a search query;
an age of a search query;
an age of response;
a length of reference material;
a style of a reference material;
an author of a search query;
an author of a response;
an author of a reference material;
attributes of an author of a search query and/or response and/or reference material;
whether a customer support content includes a hyperlink;
a text size of a search query and/or response and/or reference material;
background and/or foreground colors and/or images used to present customer support content;
font characteristics of a customer support content;
whether a details and/or context are provided with a search query;
whether a user felt like a customer support content was helpful;
a number of other users who found a customer support content helpful;
a number of customers who viewed a customer support content; and
a number of similar questions displayed with a customer support content.

22. The system of claim 17, wherein requesting the user feedback data includes displaying feedback acquisition features in the at least one user experience page, the feedback acquisition features including one or more of:
structured feedback user experience elements configured to determine if the user thought the one of the existing customer support content entries was useful;
unstructured feedback user experience elements configured to determine if the user thought the one of the existing customer support content entries was useful;
structured feedback user experience elements configured to determine if the user thought the one of the existing customer support content entries was accurate;

unstructured feedback user experience elements configured to determine if the user thought the one of the existing customer support content entries was accurate;
structured feedback user experience elements configured to determine if the user thought the one of the existing customer support content entries was relevant;
unstructured feedback user experience elements configured to determine if the user thought the one of the existing customer support content entries was relevant;
structured feedback user experience elements configured to determine if the user thought the one of the existing customer support content entries was well-written;
unstructured feedback user experience elements configured to determine if the user thought the one of the existing customer support content entries was well-written;
structured feedback user experience elements configured to determine which topic the user thought the one of the existing customer support content entries was related to; and
unstructured feedback user experience elements configured to determine which topic the user thought the one of the existing customer support content entries was related to.

23. The system of claim 22, wherein at least part of the feedback acquisition features are selected using a feedback acquisition predictive model that selects user experience elements at least partially based on the search query data and/or user characteristics of the user.

* * * * *